United States Patent [19]

De Sanna

[11] Patent Number: 4,805,097
[45] Date of Patent: Feb. 14, 1989

[54] MEMORY MANAGEMENT UNIT WITH DYNAMIC PAGE ALLOCATION

[75] Inventor: Frank De Sanna, Tempe, Ariz.

[73] Assignee: Motorola Computer Systems, Inc., Cupertino, Calif.

[21] Appl. No.: 96,287

[22] Filed: Sep. 10, 1987

Related U.S. Application Data

[63] Continuation of Ser. No. 637,446, Aug. 3, 1984, abandoned.

[51] Int. Cl.⁴ ............................................. G06F 12/10
[52] U.S. Cl. ................................................... 364/200
[58] Field of Search ... 364/200 MS File, 900 MS File

[56] References Cited

U.S. PATENT DOCUMENTS

| | | |
|---|---|---|
| 3,942,155 | 5/1976 | Lawlor ........................... 364/200 |
| 4,096,568 | 6/1978 | Bennett et al. ................. 364/200 |
| 4,245,306 | 1/1981 | Gechele .......................... 364/200 |
| 4,296,466 | 10/1981 | Guyer ............................. 364/200 |
| 4,374,417 | 2/1983 | Bradley .......................... 364/200 |
| 4,525,778 | 6/1985 | Cane ............................... 364/200 |
| 4,550,368 | 10/1985 | Bechtolsheim ................ 364/200 |

*Primary Examiner*—Raulfe B. Zache
*Assistant Examiner*—Emily Y. Chan
*Attorney, Agent, or Firm*—Walter W. Nielsen

[57] ABSTRACT

A memory management unit (MMU 12, FIG. 1) is provided which allocates space in a memory unit (2, FIG. 1) to a number of user tasks being performed concurrently by a CPU (5, FIG. 1). The MMU is capable of dynamically changing the number of concurrent user tasks and the page allocation for each task. The MMU also allows direct memory accesses into the address space of any user task.

1 Claim, 37 Drawing Sheets

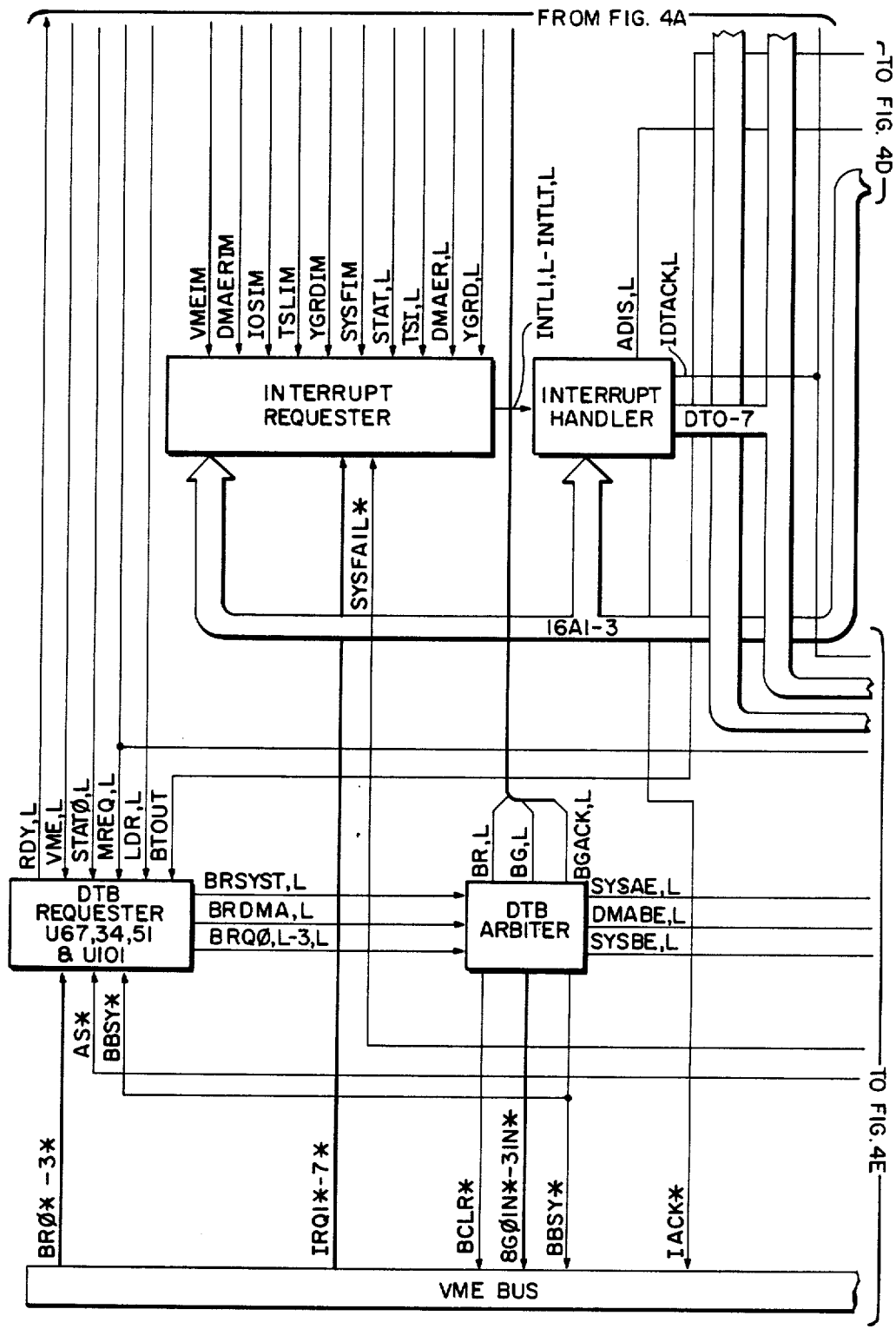
FIG._4B

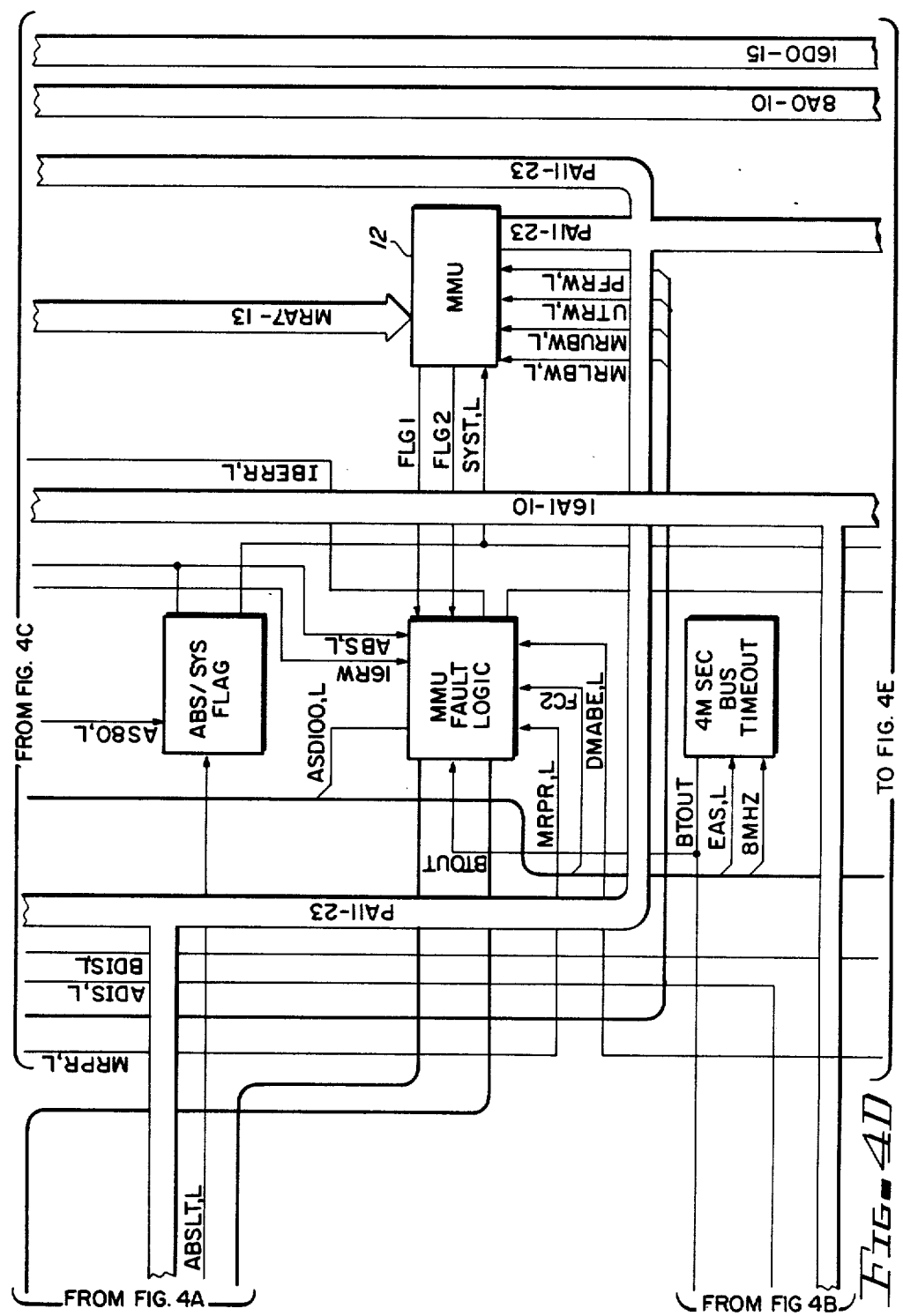

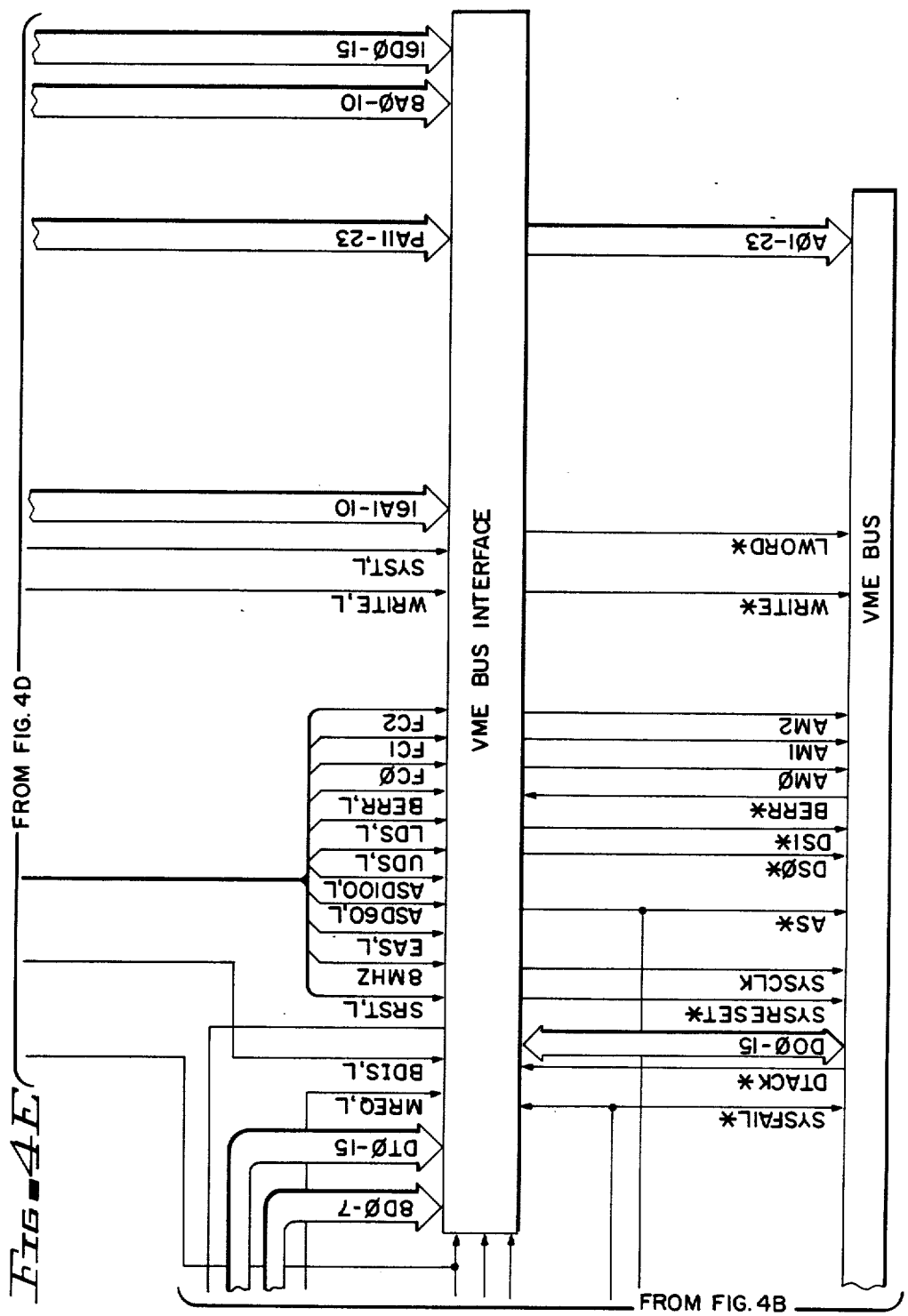

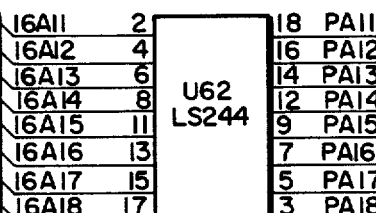
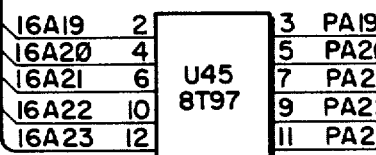
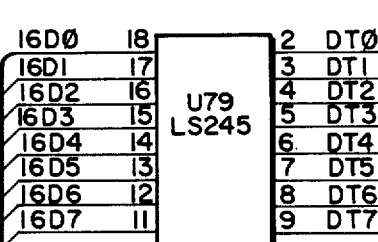

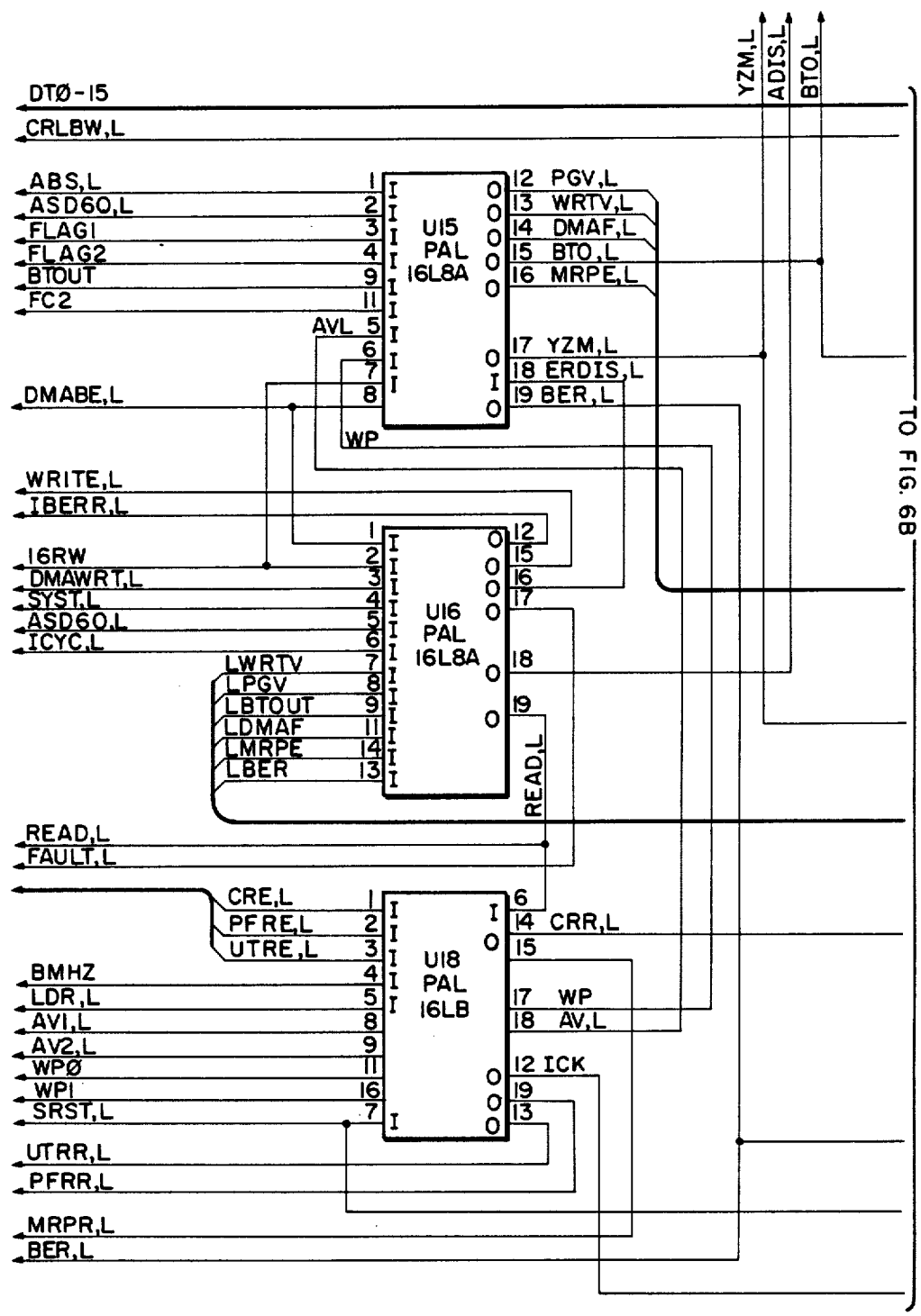
FIG_6A

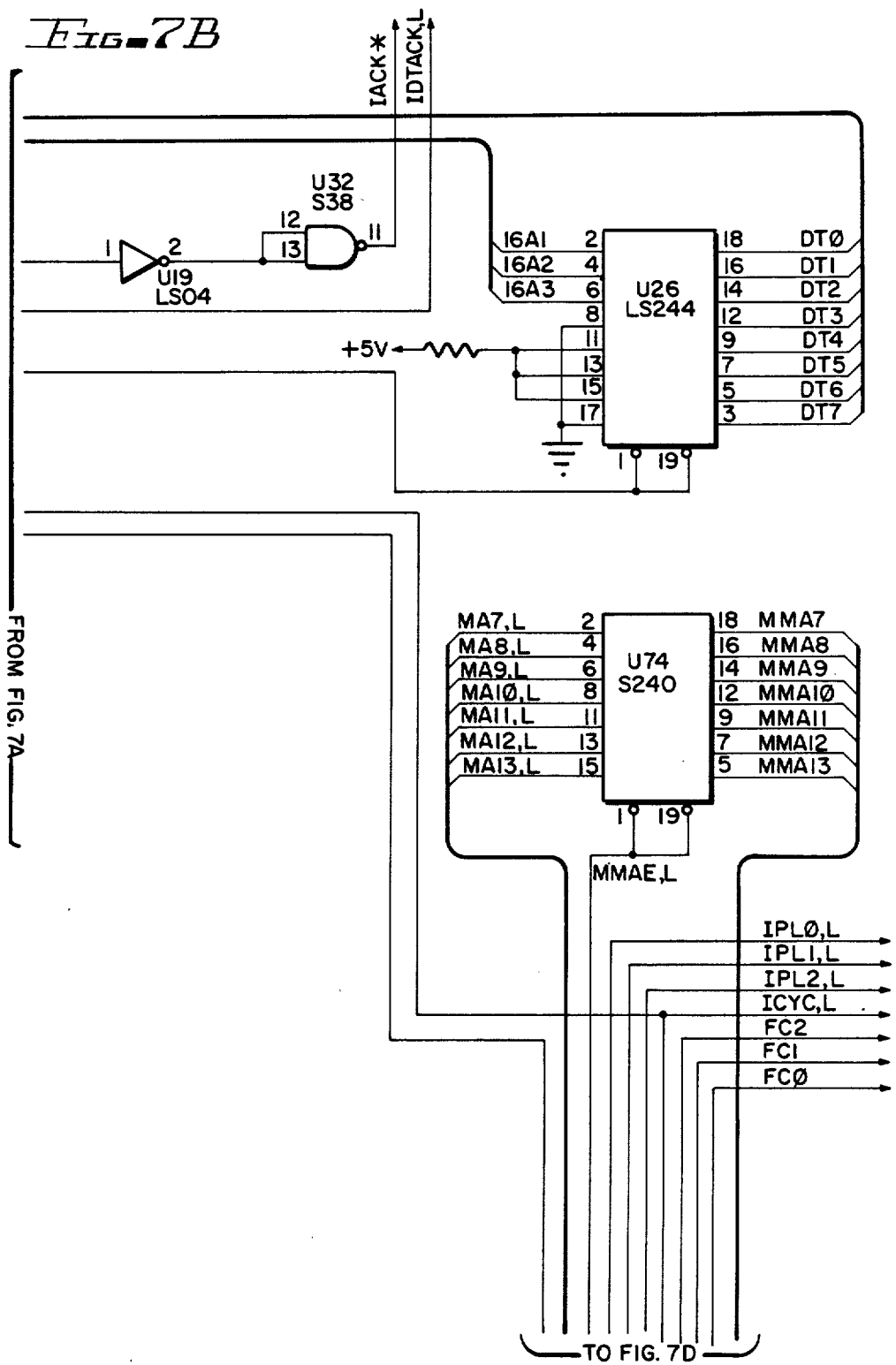

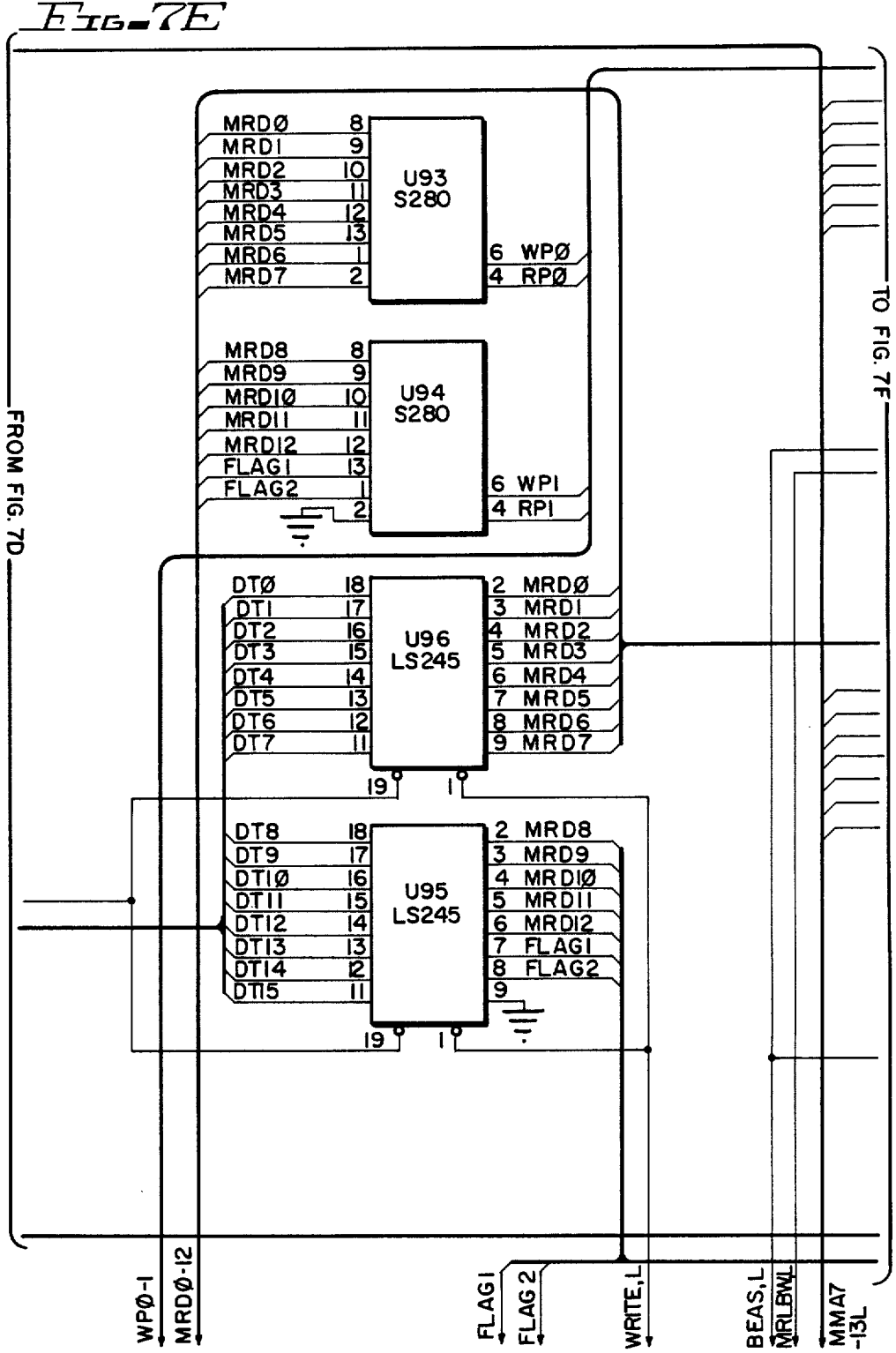

| PI-A | |
|---|---|
| 1 | D00 → |
| 2 | D01 → |
| 3 | D02 → |
| 4 | D03 → |
| 5 | D04 → |
| 6 | D05 → |
| 7 | D06 → |
| 8 | D07 → |
| 9 | GND |
| 10 | SYSCLK |
| 11 | GND |
| 12 | DS1* |
| 13 | DS0* |
| 14 | WRITE* |
| 15 | GND |
| 16 | DTACK |
| 17 | GND |
| 18 | AS* |
| 19 | GND |
| 20 | IACK* |
| 21 | IACK IN* → N.U. |
| 22 | IACK OUT* → N.U. |
| 23 | AM4 → N.U |
| 24 | A07 → |
| 25 | A06 → |
| 26 | A05 → |
| 27 | A04 → |
| 28 | A03 → |
| 29 | A02 → |
| 30 | A01 → |
| 31 | -12V |
| 32 | +5V → |

| PI-B | |
|---|---|
| 1 | BBSY* |
| 2 | BCLR* |
| 3 | ACFAIL* |
| 4 | BG0IN* |
| 5 | BG0OUT* |
| 6 | BG1 IN* |
| 7 | BG1 OUT* → N.U |
| 8 | BG2 IN* |
| 9 | BG2 OUT* → N.U. |
| 10 | BG3 IN* |
| 11 | BG3 OUT* → N.U. |
| 12 | BR0* |
| 13 | BR1* |
| 14 | BR2* |
| 15 | BR3* |
| 16 | AM0 → |
| 17 | AM1 → |
| 18 | AM2 → |
| 19 | AM3 → N.U. |
| 20 | GND |
| 21 | SERCLK → N.U. |
| 22 | SERDAT → N.U. |
| 23 | GND |
| 24 | IRQ7* |
| 25 | IRQ6* |
| 26 | IRQ5* |
| 27 | IRQ4* |
| 28 | IRQ3* |
| 29 | IRQ2* |
| 30 | IRQ1* |
| 31 | +5V STD BY → N.U. |
| 32 | +5V → |

| PI-C | |
|---|---|
| 1 | D08 → |
| 2 | D09 → |
| 3 | D10 → |
| 4 | D11 → |
| 5 | D12 → |
| 6 | D13 → |
| 7 | D14 → |
| 8 | D15 → |
| 9 | GND |
| 10 | SYSFAIL* |
| 11 | BERR* |
| 12 | SYSRESET* |
| 13 | LWORD* |
| 14 | AM5 → N.U. |
| 15 | A23 → |
| 16 | A22 → |
| 17 | A21 → |
| 18 | A20 → |
| 19 | A19 → |
| 20 | A18 → |
| 21 | A17 → |
| 22 | A16 → |
| 23 | A15 → |
| 24 | A14 → |
| 25 | A13 → |
| 26 | A12 → |
| 27 | A11 → |
| 28 | A10 → |
| 29 | A9 → |
| 30 | A8 → |
| 31 | +12V → N.U. |
| 32 | +5V → |

FIG-10

| P2-A | | | P2-B | | | P2-C | | |
|---|---|---|---|---|---|---|---|---|
| 1 | +5V | | 1 | +5V | | 1 | +5V | |
| 2 | +5V | | 2 | | N.U. | 2 | +5V | |
| 3 | +5V | | 3 | +5V | | 3 | 8A24 | |
| 4 | INT3 | N.U. | 4 | INT1,L | N.U. | 4 | RESET,L | |
| 5 | 8R/W̄ | | 5 | GND | | 5 | MREQ,L | |
| 6 | INT4 | N.U. | 6 | INT7 | N.U. | 6 | INT5 | |
| 7 | GND | | 7 | DMAGNT,L | | 7 | INT6 | N.U. |
| 8 | DMAFLT,L | | 8 | BAD,L | | 8 | 8A23 | |
| 9 | RFRQ | N.U. | 9 | 8A22 | | 9 | REFGR | N.U. |
| 10 | REAS,L | | 10 | RDY,L | | 10 | STAT0,L | |
| 11 | GND | | 11 | STAT1,L | N.U. | 11 | 8A21 | |
| 12 | VME,L | | 12 | DARQ,L | N.U. | 12 | DA1 | N.U. |
| 13 | 8A20 | | 13 | MSPAR | N.U. | 13 | DA2 | N.U. |
| 14 | DA0 | N.U. | 14 | | N.U. | 14 | OCK | N.U. |
| 15 | GND | | 15 | GND | | 15 | ECK | N.U. |
| 16 | CHDA1 | N.U. | 16 | GND | | 16 | 8MCK | |
| 17 | CHDA2 | N.U. | 17 | CHDA0 | | 17 | CHDA3 | N.U. |
| 18 | 8A17 | | 18 | 8A19 | | 18 | 8A18 | |
| 19 | 8D1 | | 19 | 8D3 | | 19 | 8A16 | |
| 20 | GND | | 20 | GND | | 20 | GND | |
| 21 | 8D2 | | 21 | 8D5 | | 21 | 8D7 | |
| 22 | 8D4 | | 22 | 8D6 | | 22 | 8D0 | |
| 23 | 8A12 | | 23 | 8A14 | | 23 | 8A15 | |
| 24 | 8A11 | | 24 | 8A13 | | 24 | GND | |
| 25 | 8A9 | | 25 | 8A8 | | 25 | 8A10 | |
| 26 | 8A4 | | 26 | 8A6 | | 26 | 8A7 | |
| 27 | 8A2 | | 27 | 8A3 | | 27 | 8A5 | |
| 28 | GND | | 28 | 8A1 | | 28 | 8A0 | |
| 29 | GND | | 29 | GND | | 29 | GND | |
| 30 | GND | | 30 | GND | | 30 | GND | |
| 31 | GND | | 31 | GND | | 31 | GND | |
| 32 | GND | | 32 | | N.U. | 32 | GND | |

FIG-11

MEMORY MANAGEMENT UNIT WITH DYNAMIC PAGE ALLOCATION

This application is a continuation of application Ser. No. 637,446, filed Aug. 3, 1984, now abandoned.

RELATED INVENTION

Direct Memory Access Controller Supporting Multiple Peripherals and Processors, invented by Glenn Schneider, U.S. Ser. No. 637,447, now U.S. Pat. No. 4,688,166, filed on even date herewith, and assigned to the assignee of the present invention.

TECHNICAL FIELD

This invention relates generally to a digital data processing system, and, in particular, to a memory management unit enabling rapid switching between tasks.

BACKGROUND OF THE INVENTION

A digital data processing system may comprise several basic units: a central processing unit, a main memory, one or more input/output devices, and an input/output controller. The central processing unit (CPU) performs arithmetic and logic functions, the main memory stores program instructions and data, the I/O units interface peripheral devices and remote users to the system, and the I/O controller coordinates the activities of the I/O units.

There is an ever increasing need for larger capacity, larger throughput systems to meet the growing needs of data processing users. Processing speeds as well as data capacity have increased. One limitation of system size has been the cost of high speed main memories. Such memories are still considerably faster than larger capacity but slower bulk memories such as magnetic disks and tapes.

Since a user needs only a portion of his program and data in storage for execution at any given time, the concept of program segmentation and memory paging evolved. With these techniques, the "virtual memory" available to the processing of tasks by the system appears greater than the real main memory.

By calling only a portion of the user's program and data into execution at any given time, the capacity requirements of the main memory are reduced. Further, the use of pages for memory storage permits greater flexibility in memory use, since a page may be stored wherever space permits, without the need for storing all related pages together. Such overhead functions as periodic memory compacting, for example, are eliminated. User security is also enhanced through the use of memory paging.

A computer memory management unit (MMU) is the name given to the portion of the above-described system which is responsible for permitting the physical main memory to be shared by multiple system and user programs or tasks.

A MMU maps the logical address, i.e. the memory address as seen by any given program or task, into the actual physical address space of the CPU. This makes the address space of each task independent of physical memory locations. The MMU also provides protection of each task's memory space from access by another task unless such sharing is explicitly allowed.

MMU's are known which are primarily concerned with minimizing the fragmentation of memory that results from the switching in and out of tasks. Other MMU's are known which provide tasks with logical memory spaces larger than the actual size of the processor's physical memory. MMU's have supported paging and segmentation memory management techniques to accomplish these purposes. Processor using such techniques often employ page tables in the system main memory, which tables comprise pointers which translate the address of each block of each task's logical address space into a physical address. Hardware registers are used to hold a subset of these page tables in order to minimize the amount of time-consuming accesses to pointers in the main memory. This mechanism relies on each task controlling the CPU for a lengthy time period and relies on high hit rates within any given task—i.e. it assumes that most memory references by a given task will be in the same general area of memory, thus minimizing swapping in and out of memory pages. In actuality, in such systems the CPU performance is degraded.

The present invention represents an improvement over known memory management units, in that it provides for very rapid switching between tasks, in addition to minimizing fragmentation and performing the other duties of a memory management unit. The present invention is used in a paged memory system in which a large number of coresident tasks each has a pointer which is stored in a hardware register. These registers are addressed directly by an identifying number assigned to the active task.

Task switching is accomplished rapidly by merely changing the contents of a register which holds the task number of the active task.

A separate register holds the task number of the executive task, so that the system can automatically switch back and forth between the executive task and the active user task.

The register set is of such size as to allow multiple tasks to have their full sets of descriptors held in fast register files. This enables high performance execution, fast task switches, and fast access by the executive data in program address space. It also enables I/O to be mapped through a range of program address spaces with the same speed as the CPU.

In a preferred embodiment of the present invention, tasks are of a predetermined maximum size. The MMU contains a software addressable register which establishes the size and number of coresident tasks which can be addressed through the MMU. This permits the system to be configured for use in environments demanding differing sizes and numbers of coresident tasks. The executive task can be up to 4 times larger than a user task.

In known MMU's employing standard paging techniques, as opposed to demand paging techniques, each task must be loaded in its entirety into main memory. The size of a task cannot change after memory loading has occurred.

The present invention provides an improved MMU which improves upon prior page oriented MMU's in that it provides for generation of an interrupt on access to a specified page. In this way, the CPU is notified that a task's memory requirements are expanding and that the memory previously assigned to the task is approaching the maximum boundary. Thus the operating system can either terminate the task or assign in more memory.

The MMU of the present invention also allows direct memory accesses into the address space of any task, thus making the system very efficient in applications requiring extensive I/O.

SUMMARY OF THE INVENTION

Accordingly, it is an object of the present invention to provide a Memory Management Unit With Dynamic Page Allocation.

It is another object of the present invention to provide a Memory Management Unit With Dynamic Page Allocation which is capable of dynamically changing the number of concurrent user tasks and the page allocation for each task. It is a further object of the present invention to provide a memory management unit which allows direct memory accesses into the address space of any user task.

These and other objects are achieved in accordance with a preferred embodiment of the invention by providing in a data processing system comprising a memory unit storing instructions and data, a central processing unit processing concurrently a plurality of tasks using the instructions and data, and a memory management unit for translating logical addresses related to the tasks into physical addresses in the memory unit, the improvement wherein the memory management unit comprises means for storing a pointer for at least one logical address for each task, the pointer corresponding to a physical address within the memory unit, and means responsive to the identity of any task for directly addressing the pointer associated with the task.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIGS. 4A-4E together illustrate a block diagram of the main CPU board, including CPU 5, MMU 12, and interprocessor command registers and data paths block 14, of the data processing system shown in FIG. 1.

FIGS. 5A-5F, 6A-6C, 7A-7F, 8A-8F, and 9A-9F together form a detailed circuit diagram of the main processor board, including the Memory Management Unit With High Speed Translation, of the data processing system shown in FIG. 1.

FIGS. 5A-5F, in particular, show the DMA bus request logic and bus interface logic.

FIGS. 6A-6C, in particular, show the system status logic, error control logic, the system status register, MMU error detection logic, and on-board interrupt logic.

FIGS. 7A-7F, in particular, show the interrupt comparison and interrupt request logic, the page file register, the task register, the MUX, and the page file MAP RAM.

FIGS. 8A-8F, in particular, show the processor, power-up, and clock circuitry, and the bus allocation and DTB arbiter logic.

FIGS. 9A-9F, in particular, show address decode and latch logic, bus control logic, and I/O command and status logic.

FIG. 10 shows the signal assignments of the P1 edge connector to the main processor board.

FIG. 11 shows the signal assignments of the P2 edge connector to the main processor board.

DESCRIPTION OF THE PREFERRED EMBODIMENT

Figure 1:
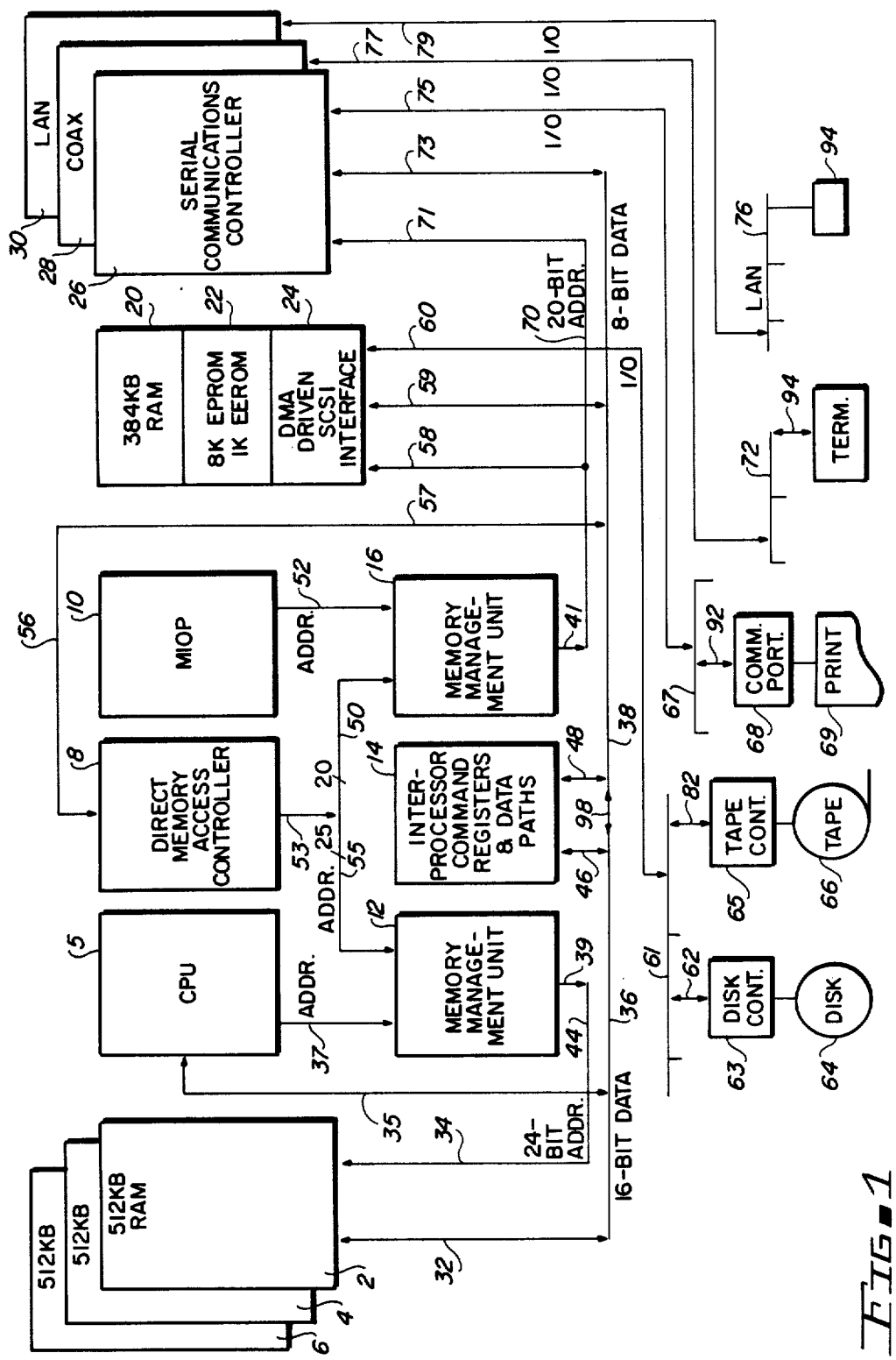
FIG. 1 shows a block diagram illustrating a preferred embodiment of a data processing system incorporating the Memory Management Unit With Dynamic Page Allocation of the present invention.

Referring now to FIG. 1, a block diagram of a digital data processing system employing a preferred embodiment of the Memory Management Unit with Dynamic Page Allocation of the present invention is shown. The system comprises three 512K blocks of main memory 2, 4, and 6, which are coupled via bus 32 to the system 16-bit data bus 36 and via bus 34 to the system 24-bit address bus 44. A central processing unit (CPU) 5 is coupled via bus 35 to data bus 36 and via address bus 37 to memory management unit (MMU) 12. The MMU 12 of the present invention is also coupled to 25-bit address bus 55 and is coupled via bus 39 to address bus 44.

Direct memory access controller (DMAC) 8 is coupled via bus 53 to 25-bit address bus 55 and to 20-bit address bus 50. DMAC 8 is also coupled to data bus 56. A more detailed description of DMAC 8 may be found in the above-referenced related invention.

A master input/output processor (MIOP) 10 is coupled to data bus 56 and to address bus 52. A second MMU 16, which is not the subject of the present invention, is also coupled to address bus 52, to address bus 50, and via bus 41 to 20-bit address bus 70.

Blocks 20, 22, and 24 are shown as one block for ease of illustration. Block 20 represents a 384K RAM. Block 22 represents an 8K EPROM and 1K EEROM. And Block 24 represents an industry standard small computer system interface (SCSI). Blocks 20, 22, and 24 are coupled via bus 58 to address bus 70, via bus 59 to 8-bit system data bus 38, and via I/O bus 60 to bus 61. To bus 61 are coupled various mass storage units and their respective controllers. For example, intelligent disk controller 63 is coupled to disk drive 64 and via bus 62 to bus 61. Tape controller 65 is coupled to tape drive 66 and via bus 82 to bus 61.

Blocks 26, 28, and 30 are also shown as one block for ease of illustration. Block 26 represents a serial communications controller. Block 28 represents a coaxial interface to user workstations, terminals, and other devices. And block 30 represents a local area network (LAN) interface to user devices. Blocks 26, 28, and 30 are coupled via bus 71 to address bus 70 and via bus 73 to data bus 38. The serial communications controller 26 is coupled via bus 75 to bus 67, to which are coupled various communications ports, for example, port 68 supporting printer 69. The coax interface 28 is coupled via bus 77 to bus 72, to which are coupled various user terminals or other devices, such as terminal 74. The LAN 30 is coupled via bus 79 to LAN bus 76, to which are coupled various user devices, such as device 94.

Block 14 represents various interprocessor command registers and data paths and is coupled via bus 46 to 16-bit data bus 36 and via bus 48 to 8-bit data bus 38. Tri-state bus 98 couples data bus 36 and data bus 38.

In FIG. 1, the CPU 5, MMU 12, and interprocessor command registers and data paths circuitry 14 are implemented on one printed circuit board, the detailed schematic of which is illustrated in FIGS. 5-9 of the present invention. The DMAC 8, MIOP 10, and MMU 16 are implemented on a different printed circuit board, the detailed schematic of which is illustrated in the above-referenced invention. In FIG. 1, bus 35 represents data lines D00-D15 in the detailed schematics. Bus 39 represents address lines A01-A23 in the schematics. Bus 55 represents address lines PA0-PA19 plus AS-4-AS7. Bus 41 represents address lines PA0-PA19, and bus 57 repesents lines DB0-DB7.

Figure 2:
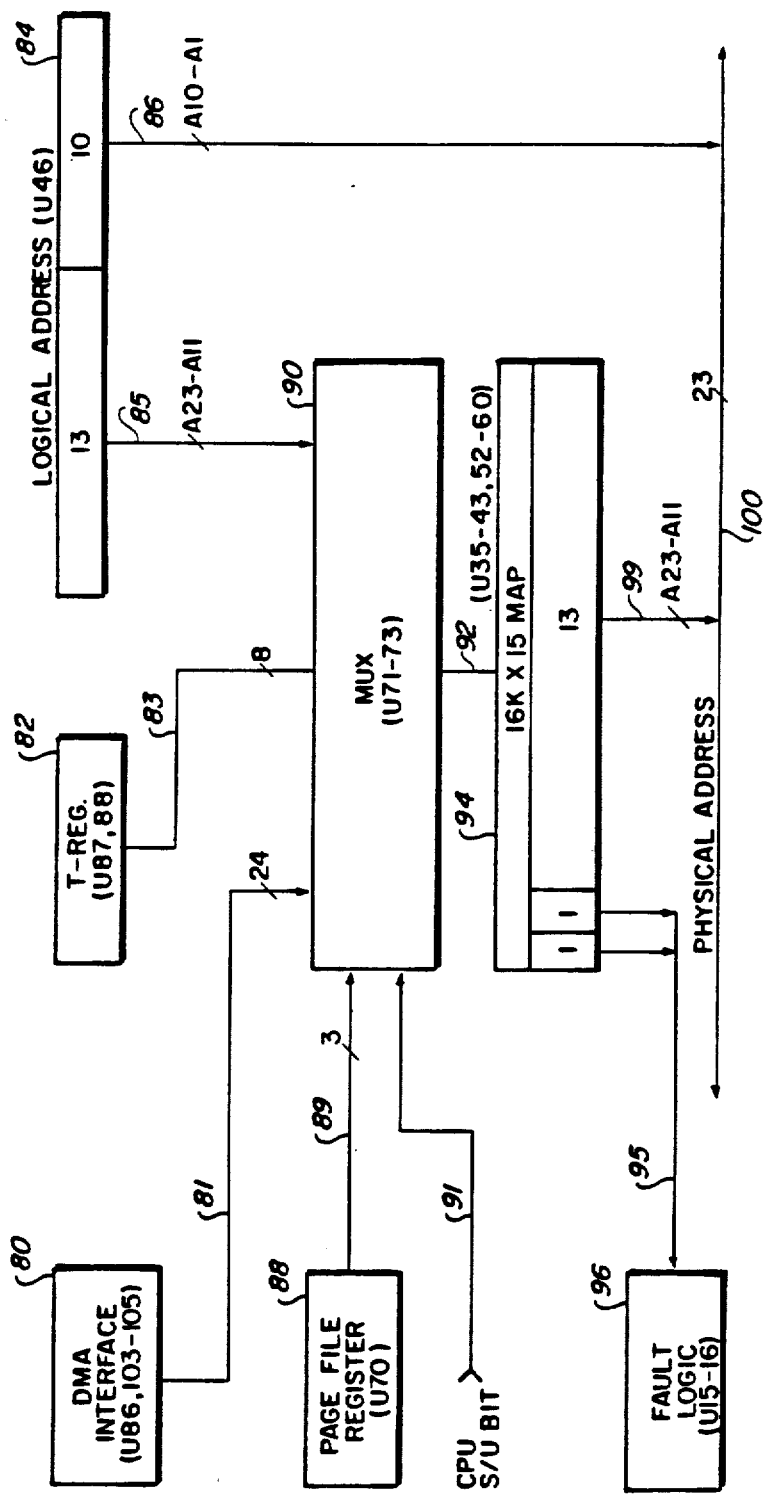
FIG. 2 shows a block diagram illustraing a portion of the Memory Management Unit With High Speed Translation of the present invention.
Figure 3A:
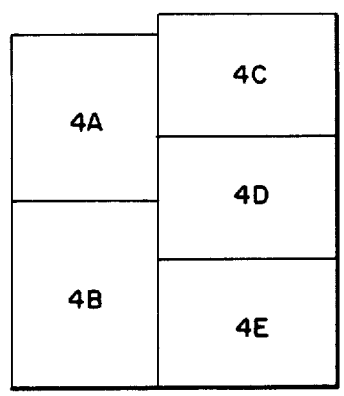
FIG. 3A represents the keyplan for FIGS. 4A-4E.
Figure 3B:
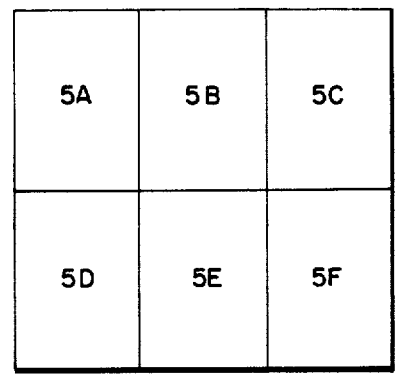
FIG. 3B represents the keyplan for FIGS. 5A-5F.
Figure 3C:
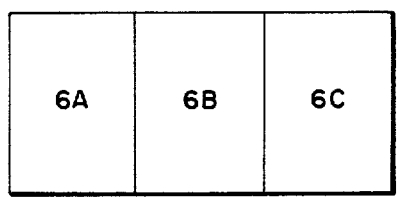
FIG. 3C represents the keyplan for FIGS. 6A-6C.
Figure 3D:
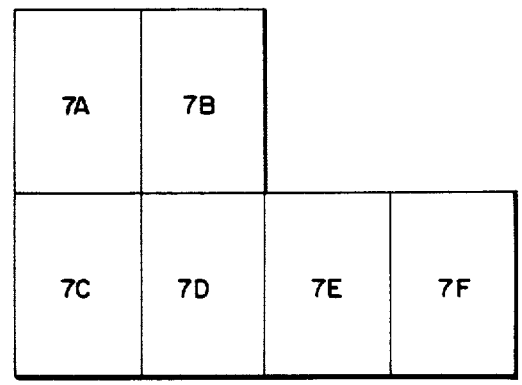
FIG. 3D represents the keyplan for FIGS. 7A-7F.
Figure 3E:
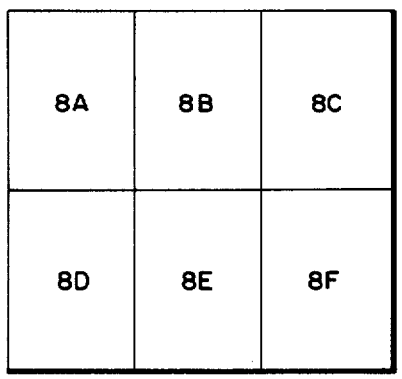
FIG. 3E represents the keyplan for FIGS. 8A-8F.
Figure 3F:
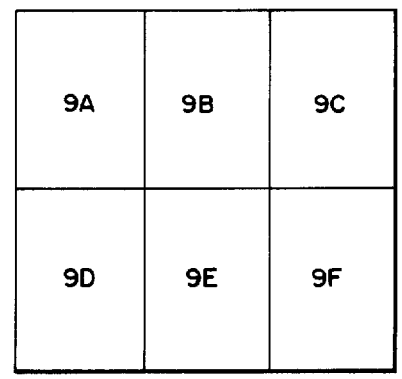
FIG. 3F represents the keyplan for FIGS. 9A-9F.

FIG. 2 shows a block diagram illustrating in greater detail the MMU 12 of the present invention. DMA Interface 80, represented by units U86 and 103-105 in the detailed schematics, is coupled via 24-bit bus 81 to multiplexer 90. Multiplexer 90, represented by units U71-73 in the schematics, is coupled via bus 89 to page file register 88, represented by unit U70 in the schematics.

Multiplexer 90 is responsive via bus 91 to a "CPU S/U Bit" signal. Multiplexer 90 is also coupled via 7-bit bus 83 to T-Register 82, represented by units U87-88 in the schematics. Multiplexer 90 is also coupled via 13-bit bus 85 to the 13-bit portion of the logical address 84, represented by unit U46 in the schematics. The 10-bit portion of the logical address 84 is coupled via 10-bit bus 86 to the physical address bus 100.

Multiplexer 90 is coupled via bus 92 to a 16K by 15 memory mapping circuit 94, represented by units U3-5-43 and U52-60 in the schematics. The two MSB's of each word in the memory mapping circuit 94 are coupled via bus 95 to fault logic 96, represented by units U15-16 on the schematics. The 13-bit portion of each word in the memory mapping circuit 94 is coupled via bus 99 to the physical address bus 100.

FIGS. 4A-4E together illustrate a detailed block diagram of the main CPU board, including CPU 5, MMU 12, and interprocessor command registers and data paths block 14, of the data processing system shown in FIG. 1.

FIGS. 5A-5F, 6A-6C, 7A-7F, 8A-8F, and 9A-9F together form a detailed circuit diagram of the main processor board, including the MMU 12 of the present invention.

FIG. 10 shows the signal assignments of the P1 edge connector to the main processor board. FIG. 11 shows the signal assignments of the P2 edge connector to the main processor board.

In FIGS. 5-9, much of the logic has been implemented in the form of commercially available integrated circuit components, the part numbers of which may be found in Appendix A. Other portions of the logic have been implemented by commercially available programmable array logic (PAL) elements available from Monolithic Memories and by commercially available field programmable logic arrays (FPLA), the programs for which may be found in Appendix B.

The MMU 12 is the mechanism used by CPU 5 to manage the address space of the 16-bit RAM's 2, 4, and 6. It allows the operating system to manage and protect memory by means of attributes. To all programs executing in the CPU 5, all memory addresses are 23 bits wide. Before these lines reach the memory bus, they pass through the memory management section of the main CPU board.

The mechanism translates logical addresses from both the CPU 5 and MIOP 10 into physical addresses. Translation takes place through a lookup table containing transformation values which can be manipulated by software.

Basic signal flow is illustrated in the MMU block diagram of FIG. 2. In the circuitry, the low order physical address lines A1 through A10 are the same as low order logical address lines A0 through A10. These lines bypass the MMU and are taken directly to the system bus. Outputs of the look-up memory table 94 carry the most significant 13 bits of the 23 bit physical address.

MMU Registers

Figure 4A:
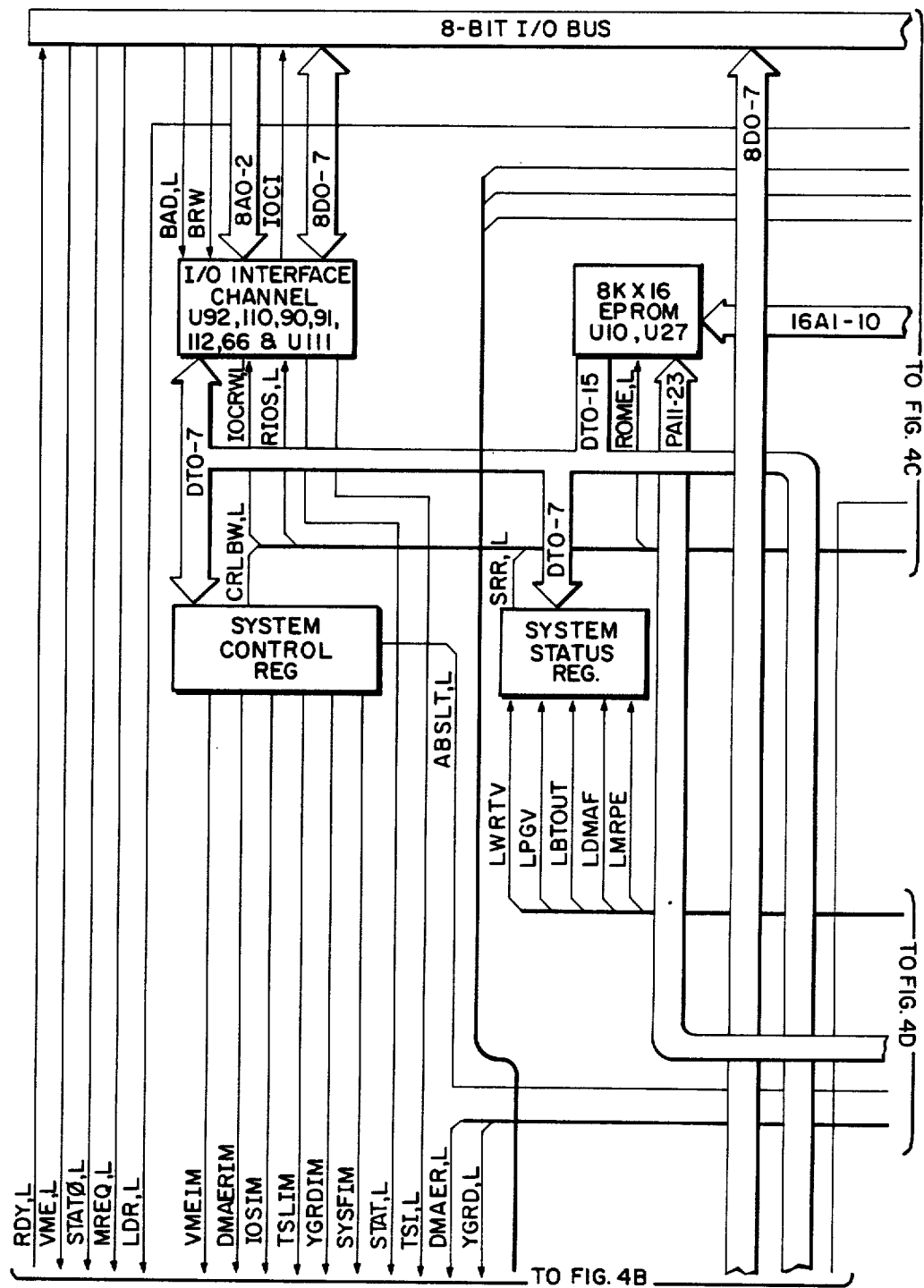
Figure 4C:
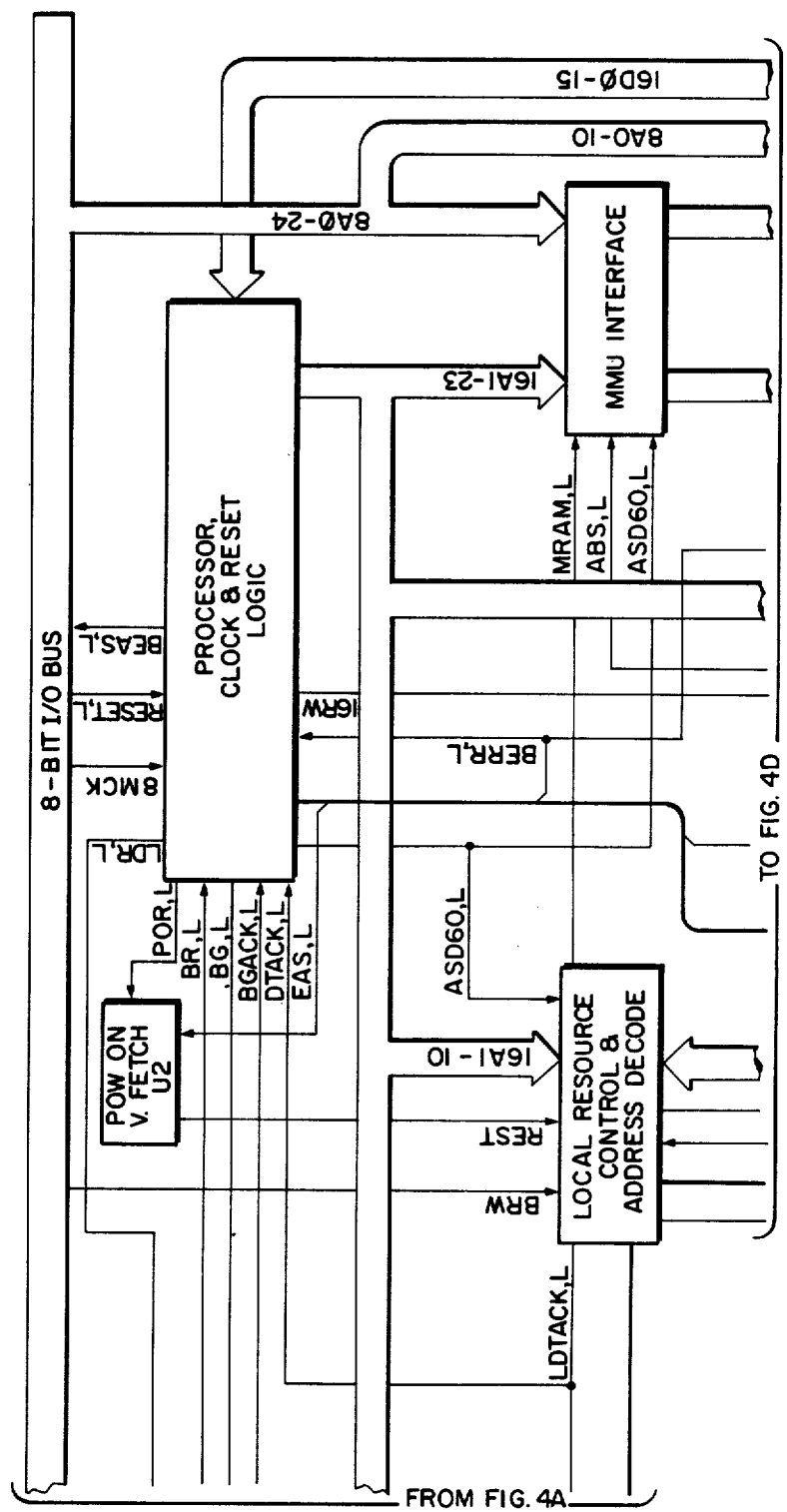
Figure 5A:
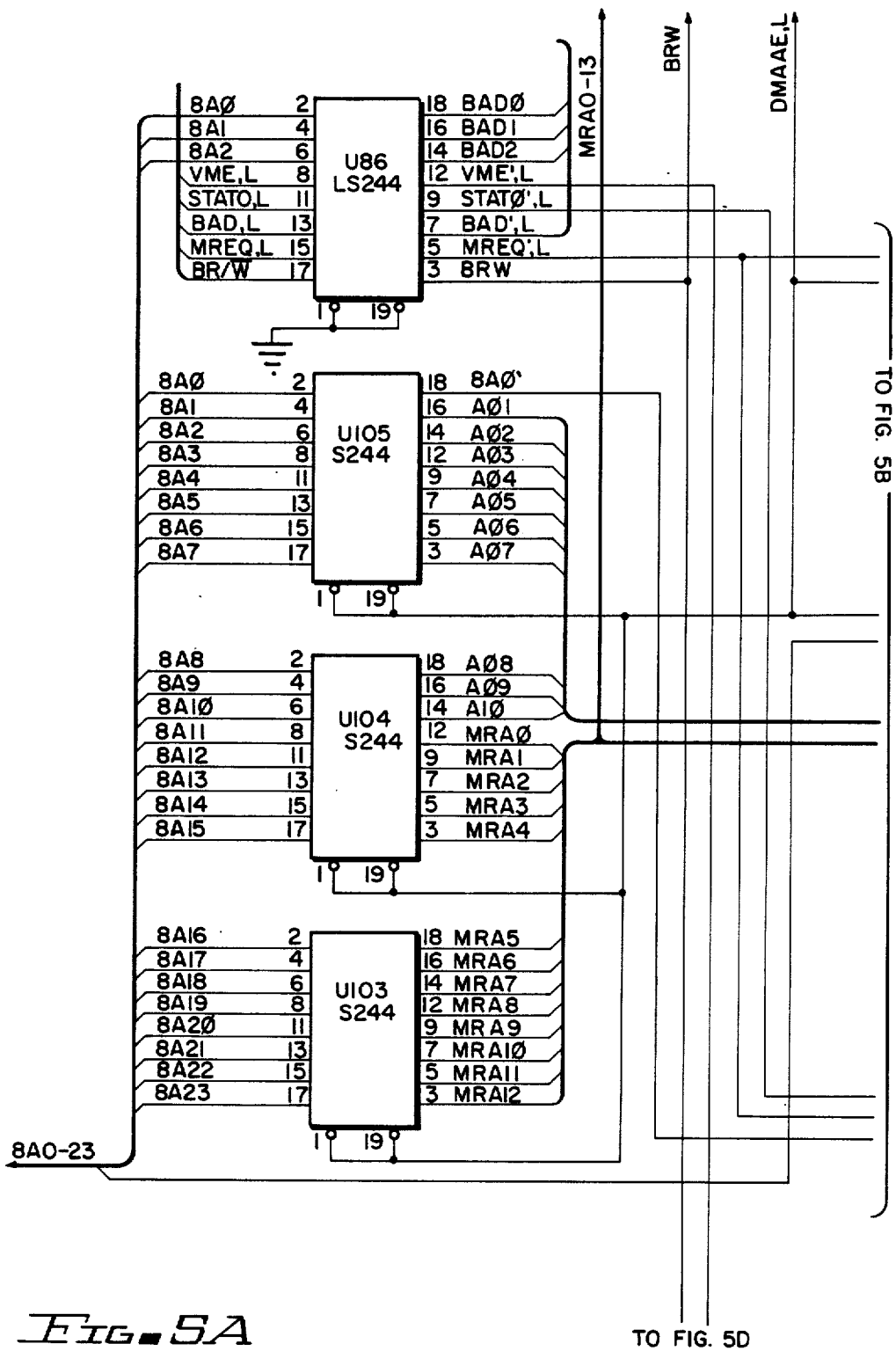
Figure 5B:
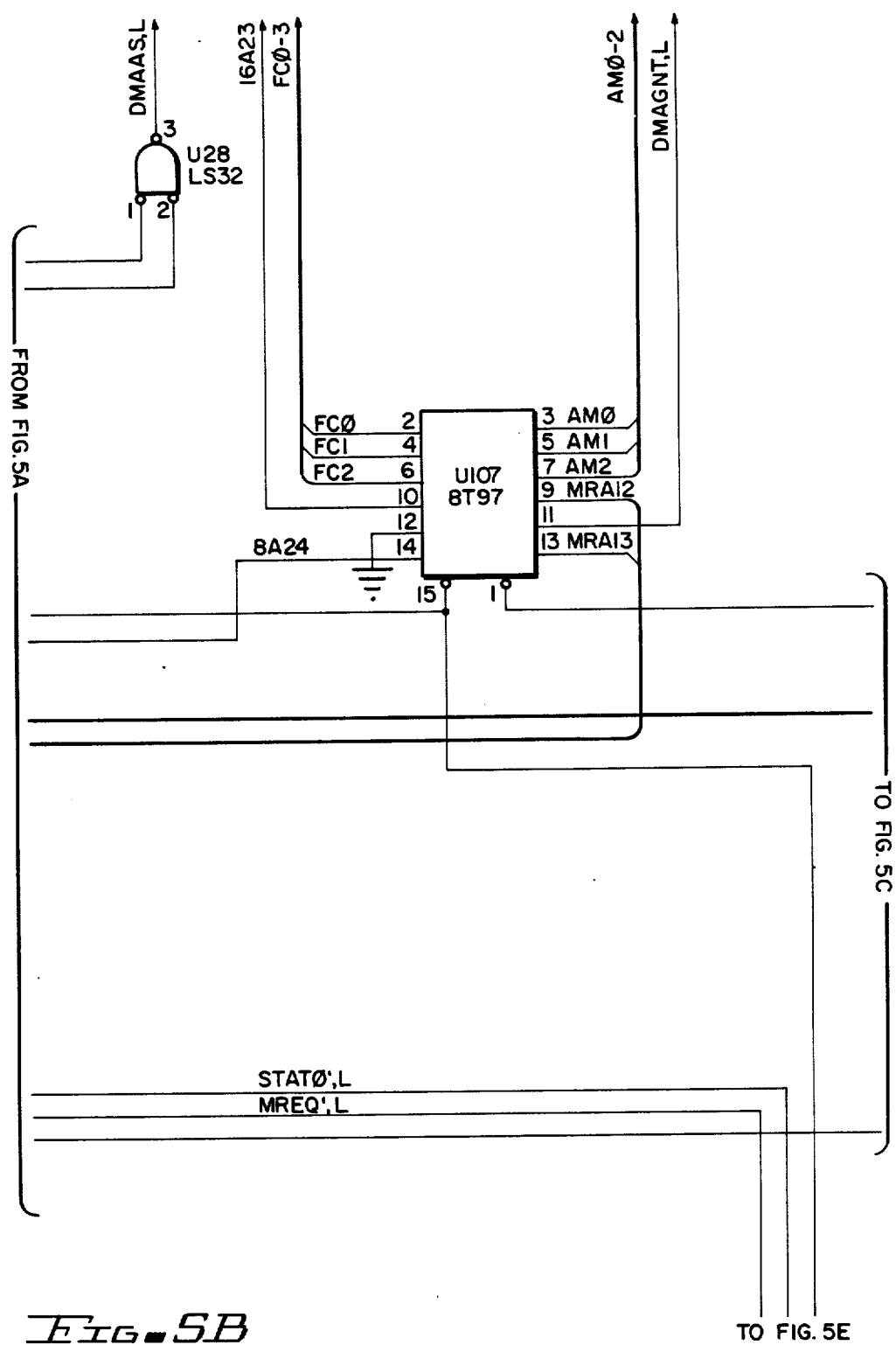
Figure 5C:
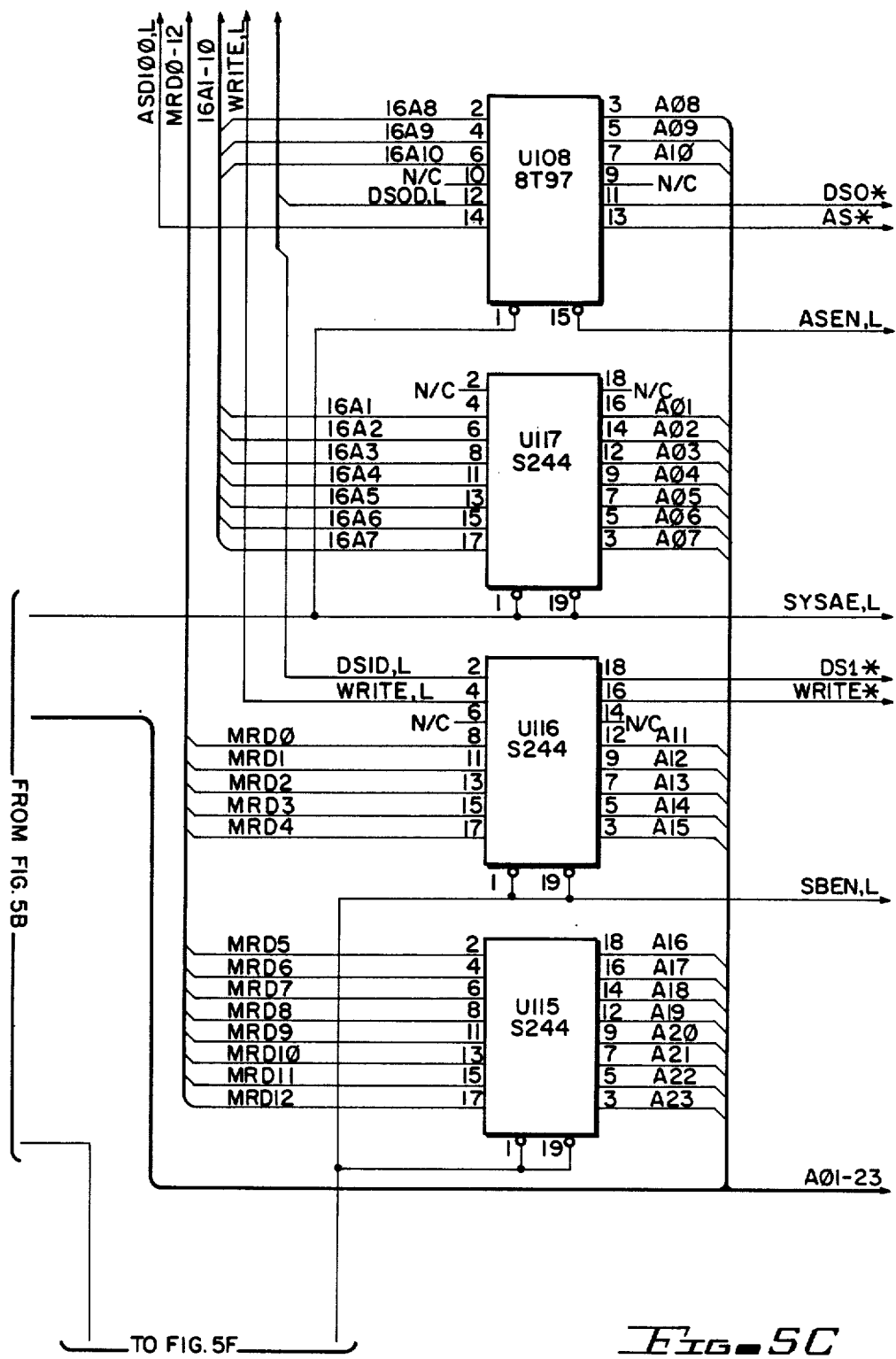
Figure 5E:
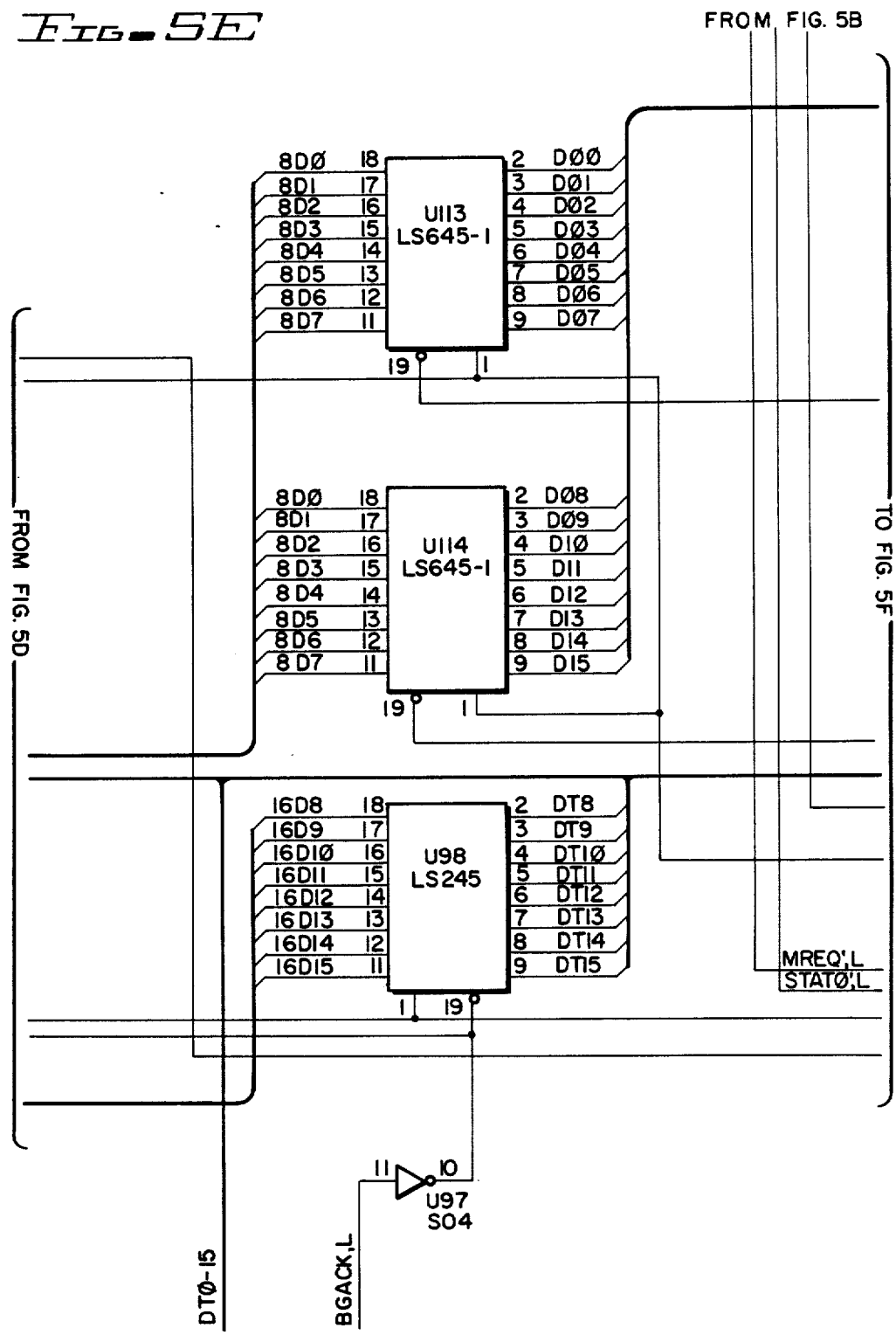
Figure 5F:
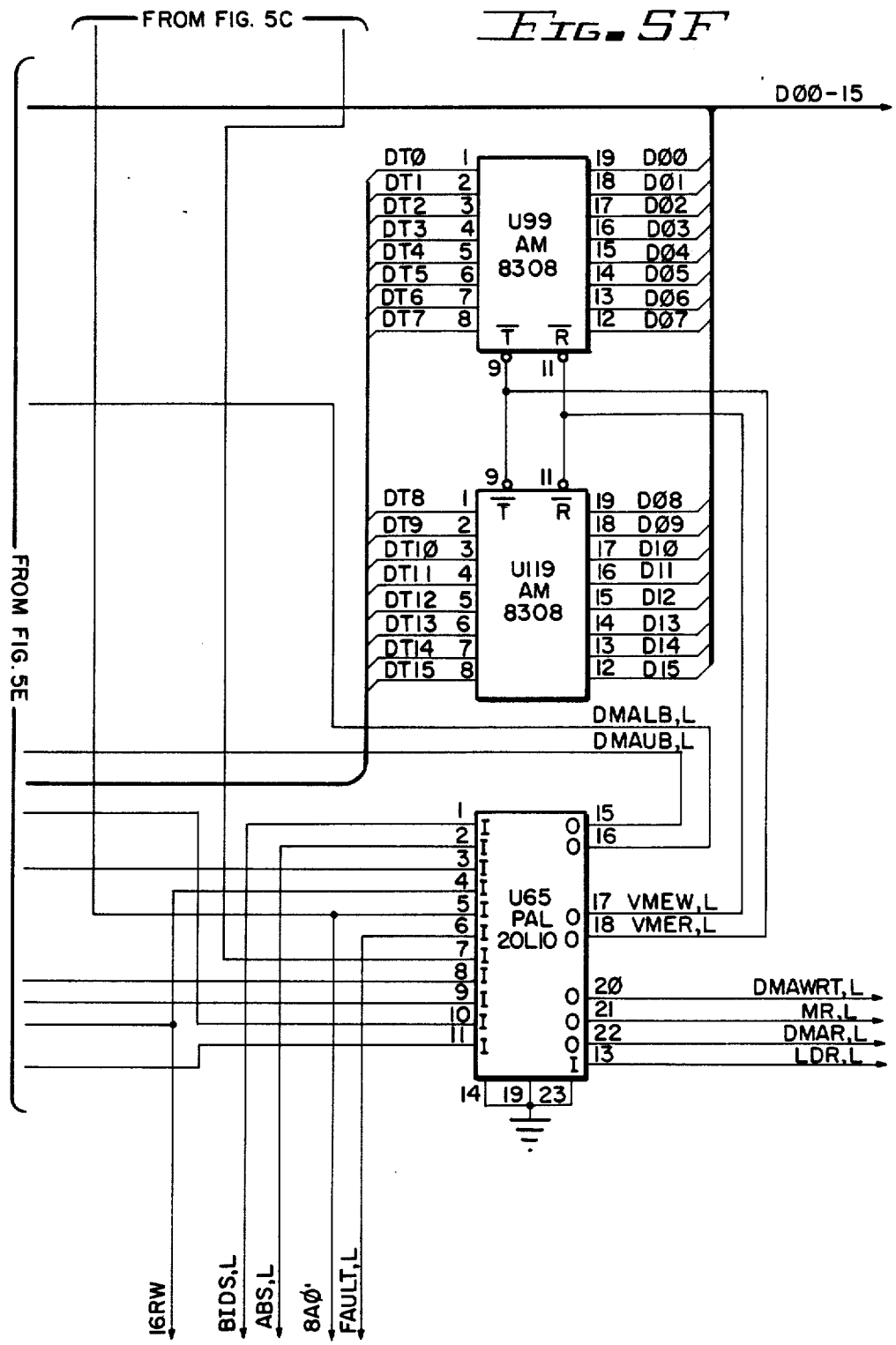
Figure 6B:
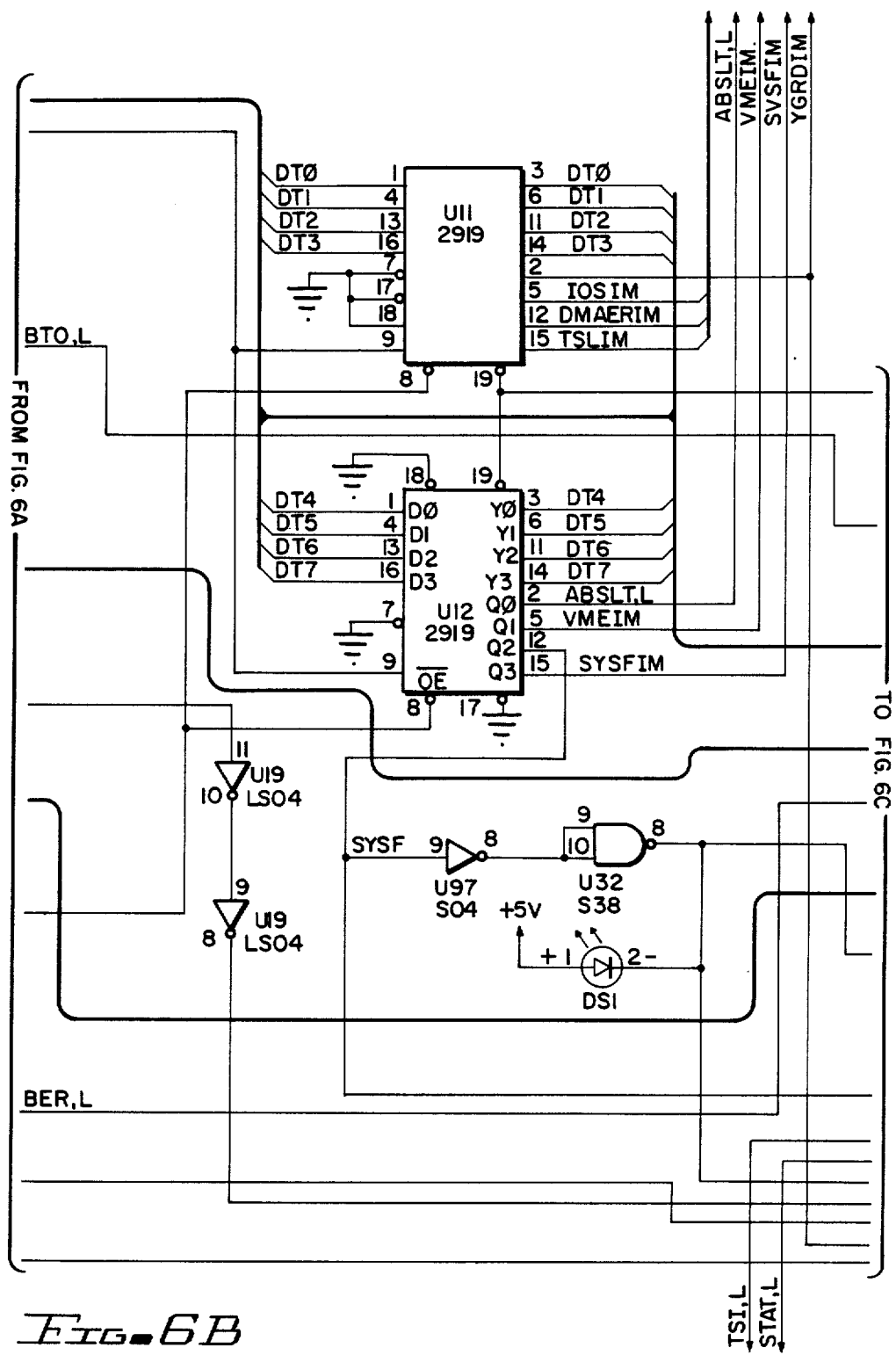
Figure 6C:
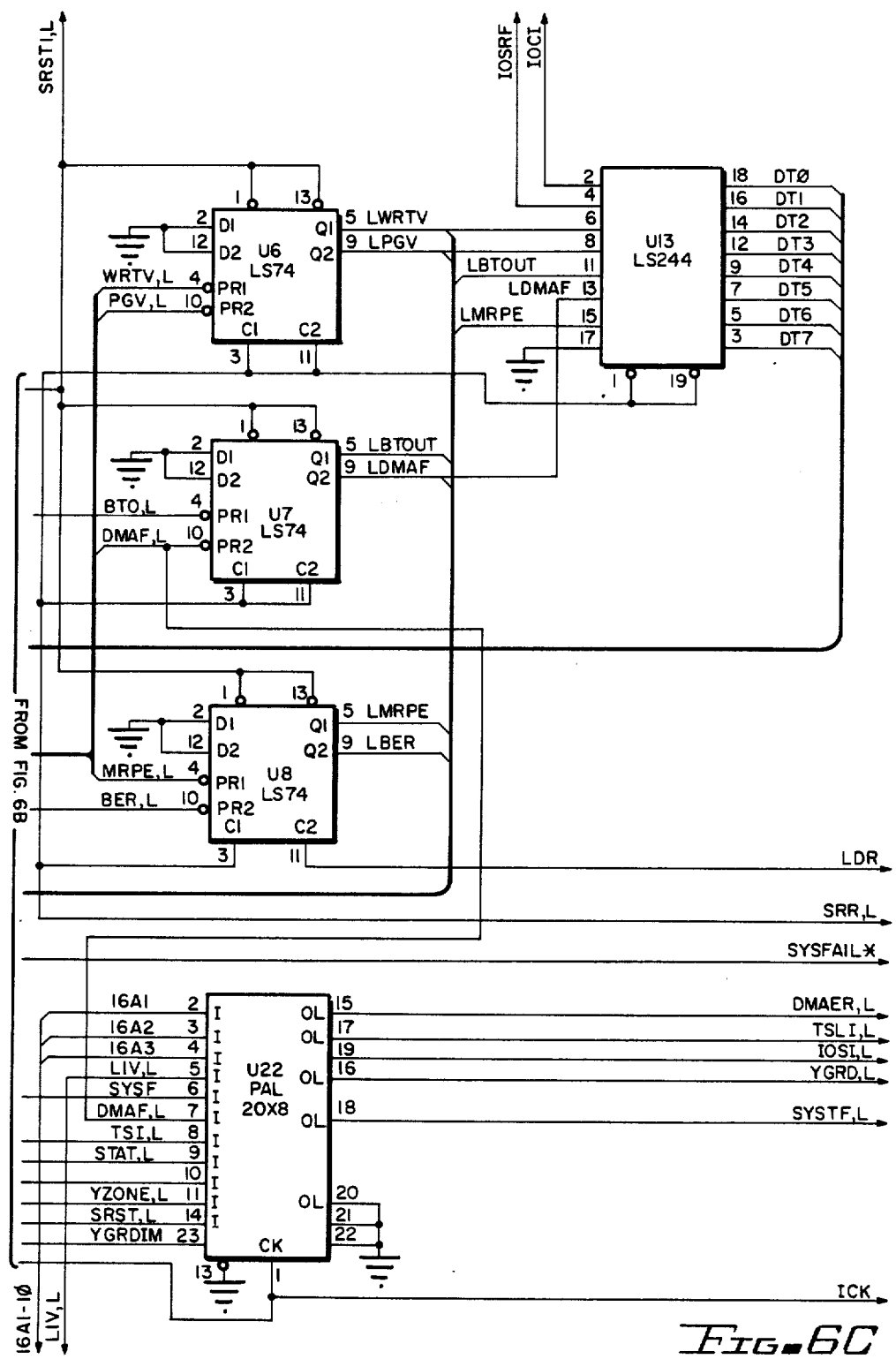
Figure 7A:
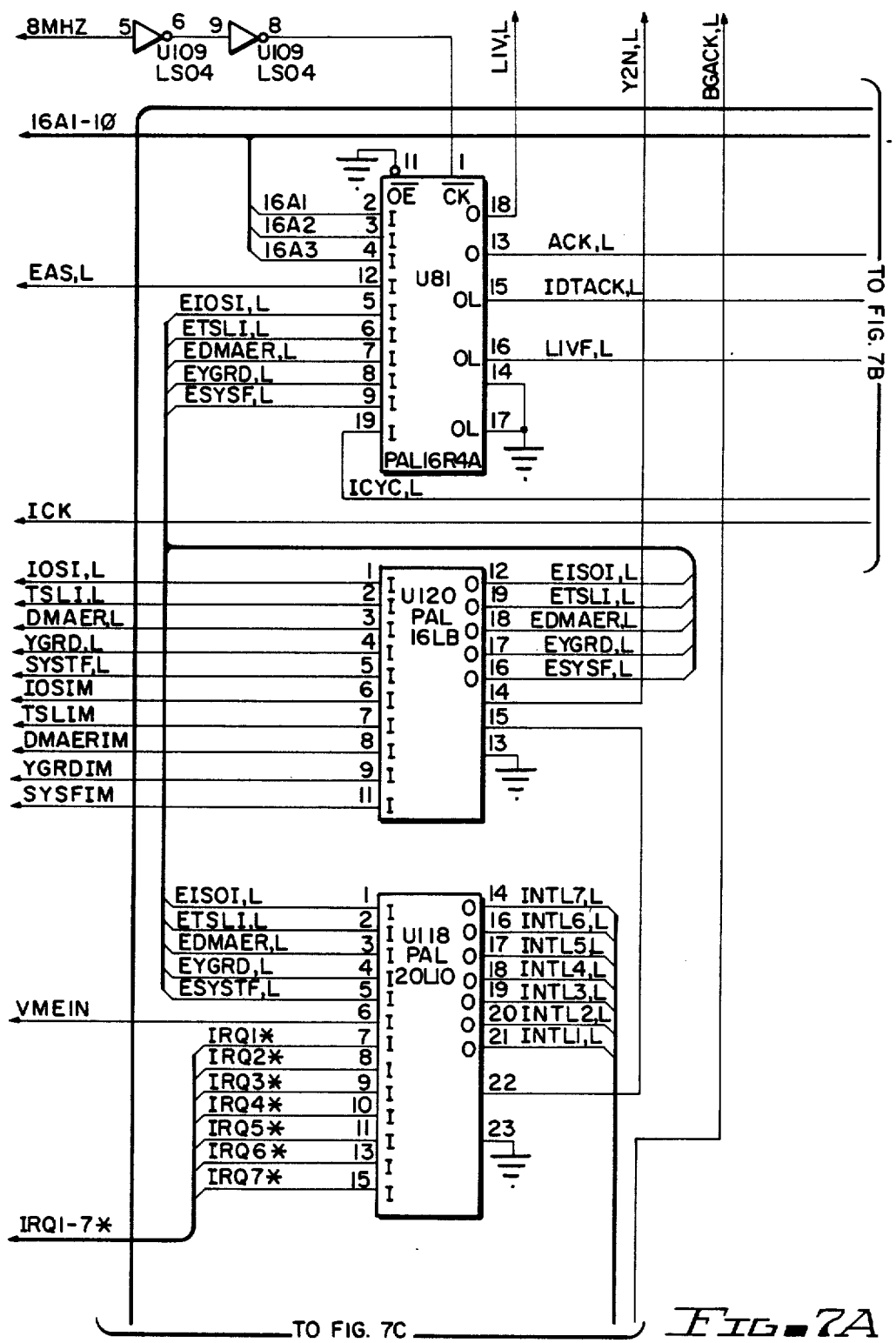
Figure 7C:
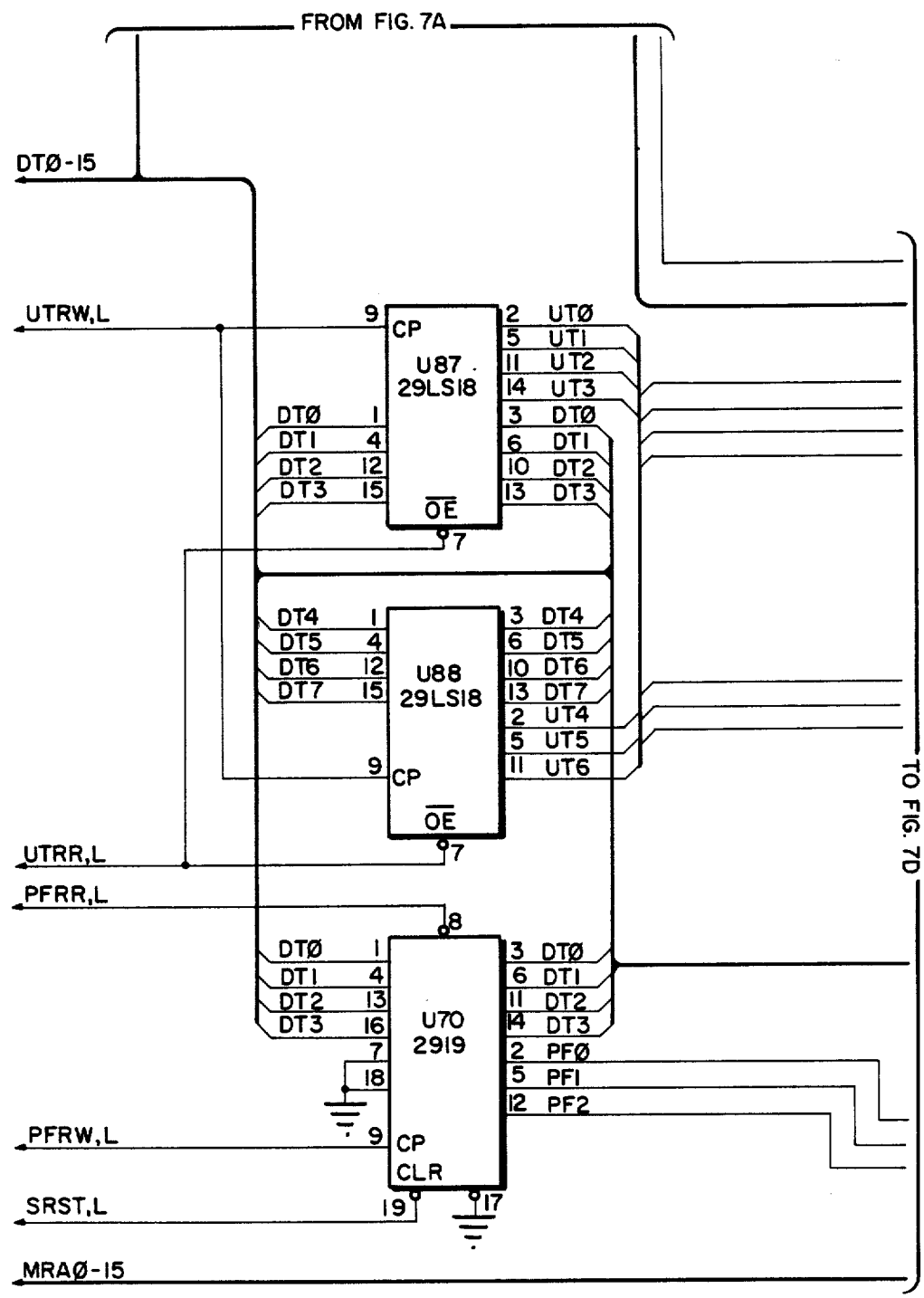
Figure 7D:
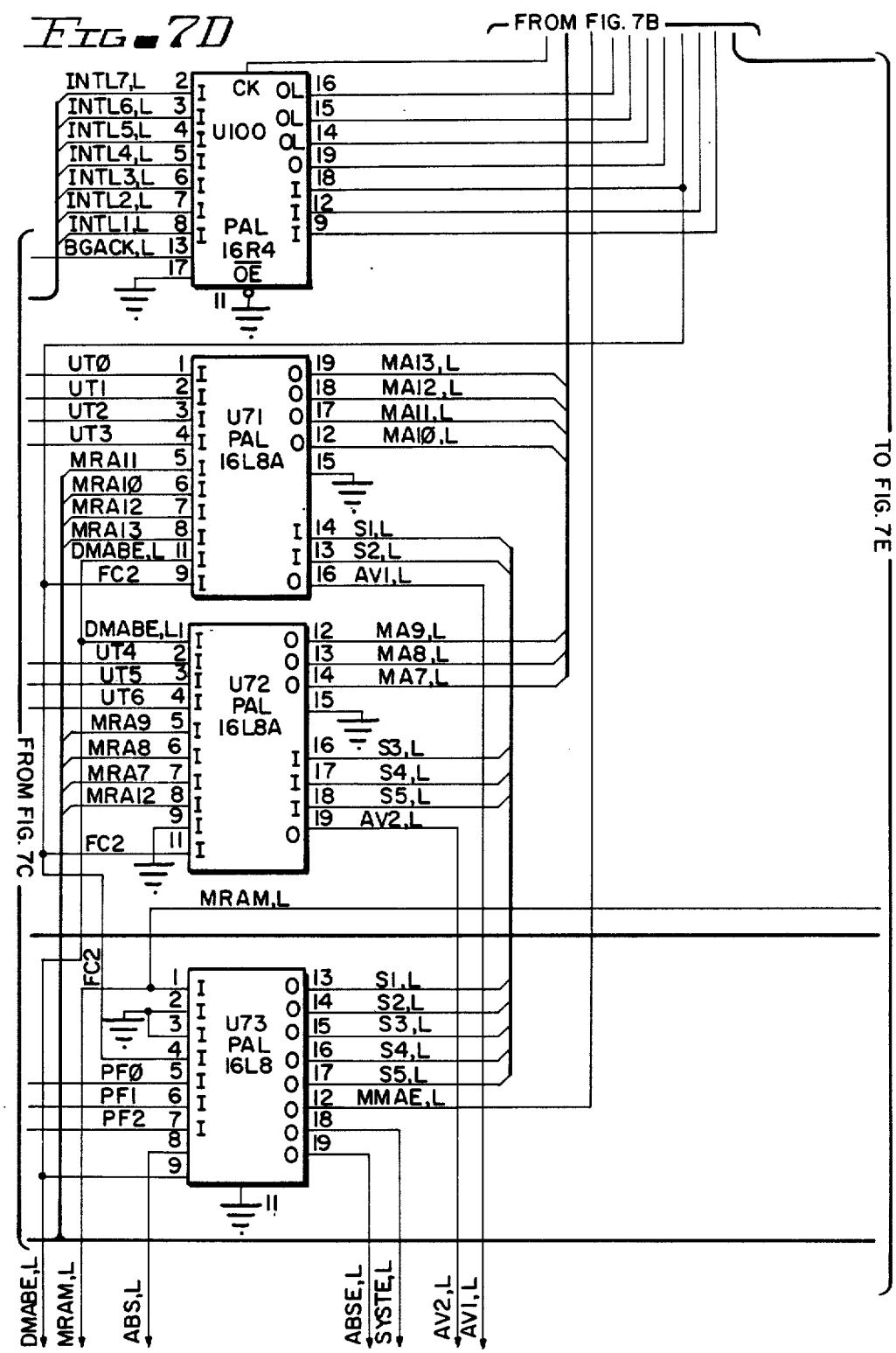
Figure 7F:
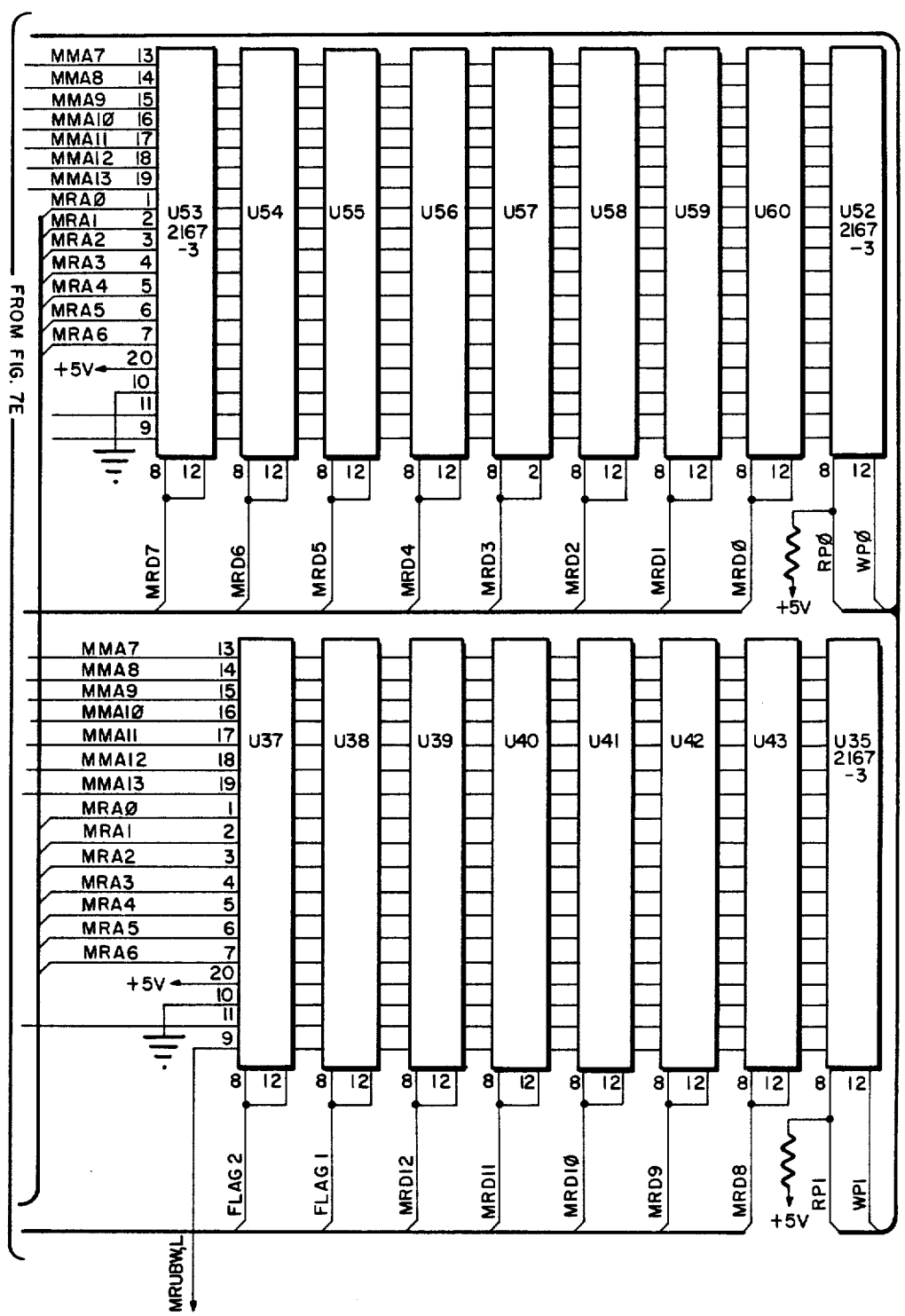
Figure 8A:
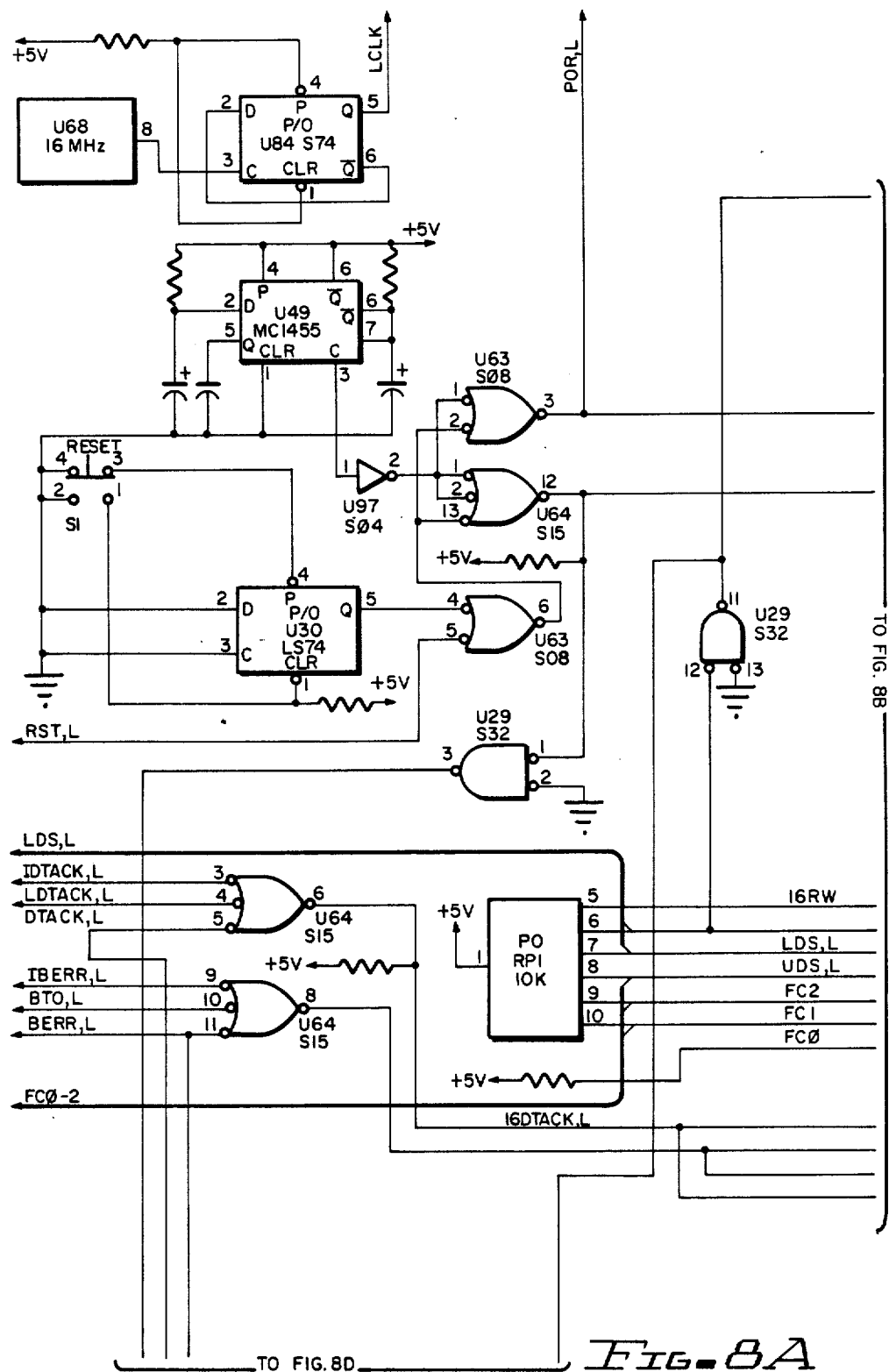
Figure 8B:
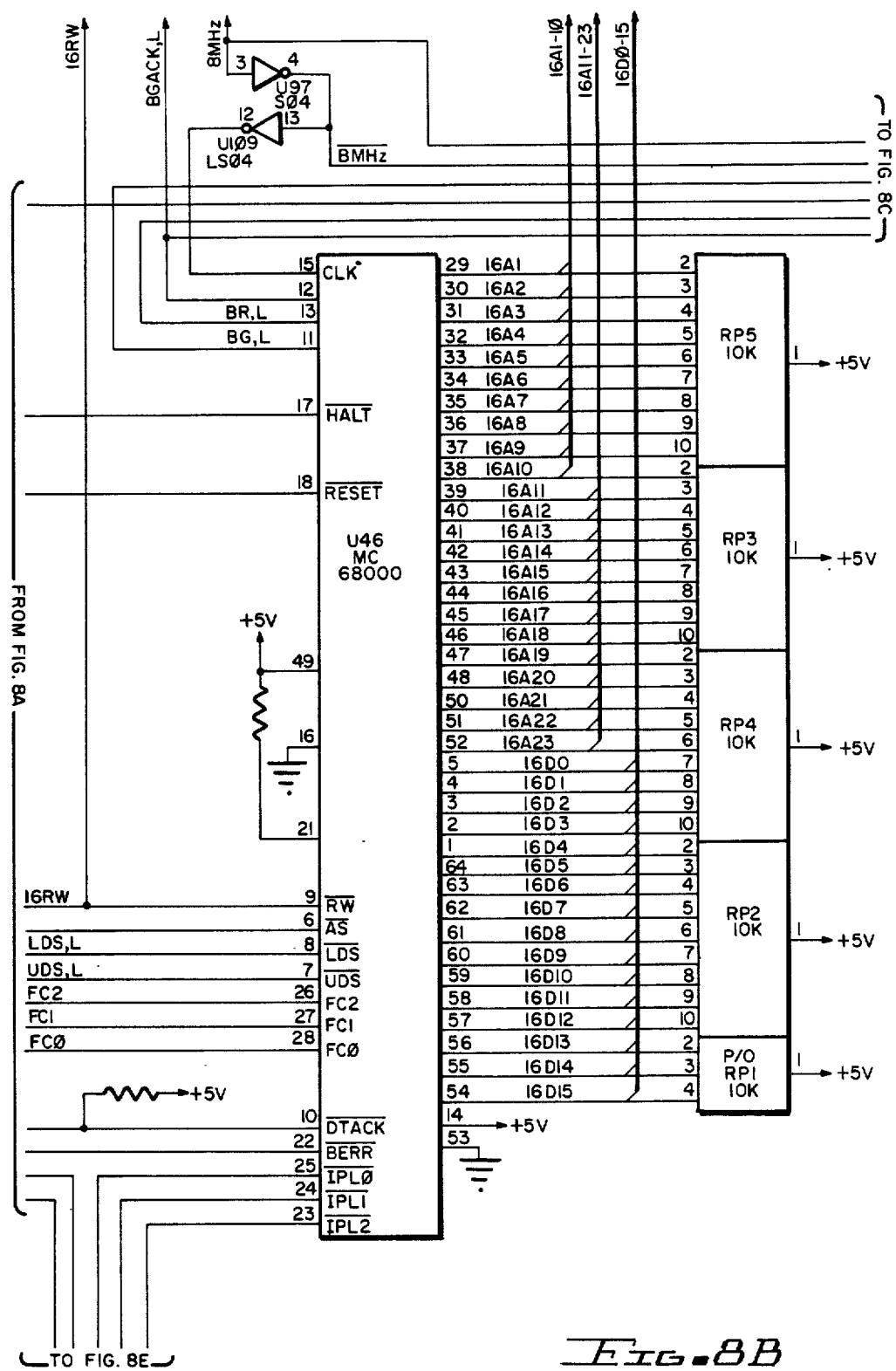
Figure 8C:
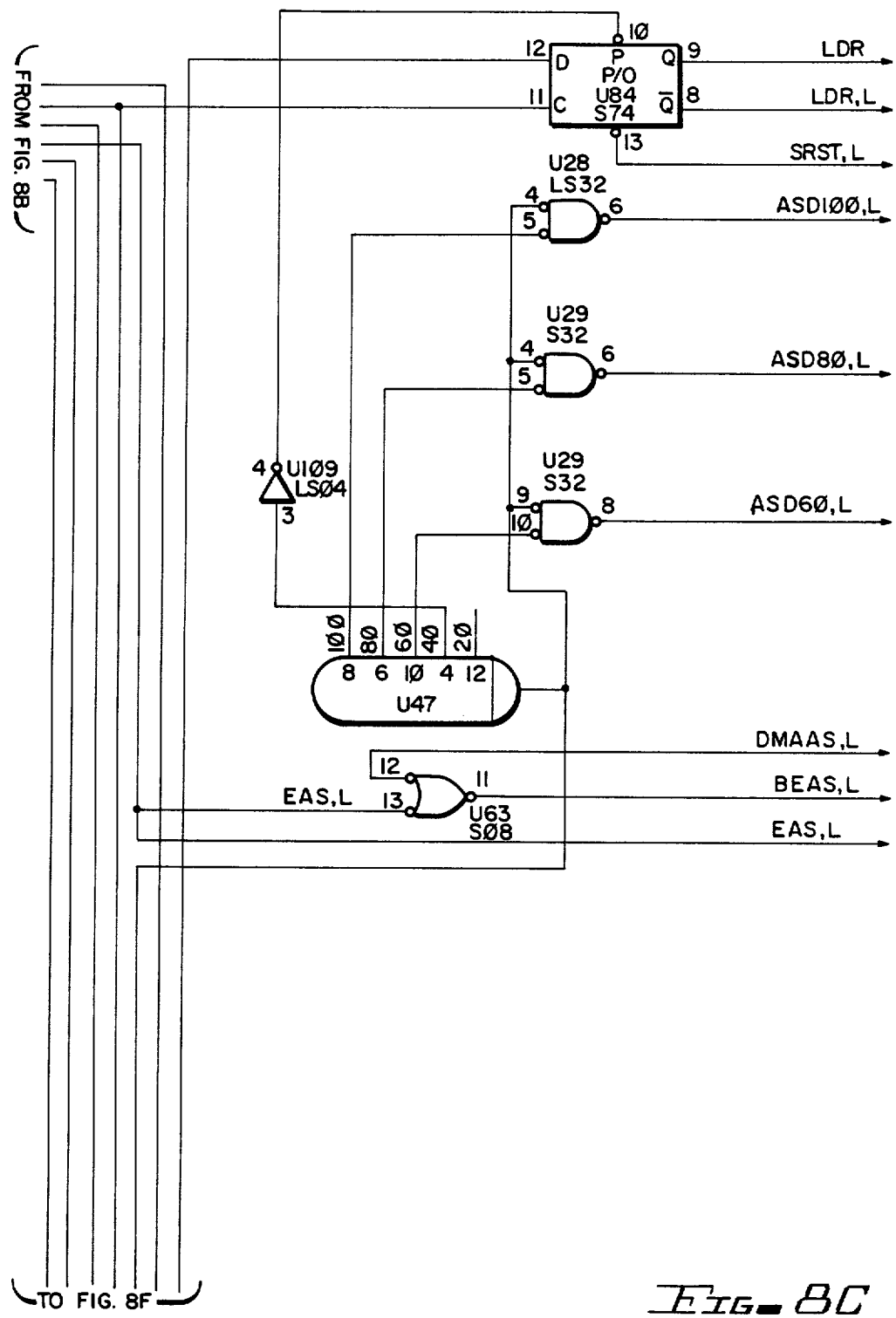
Figure 8D:
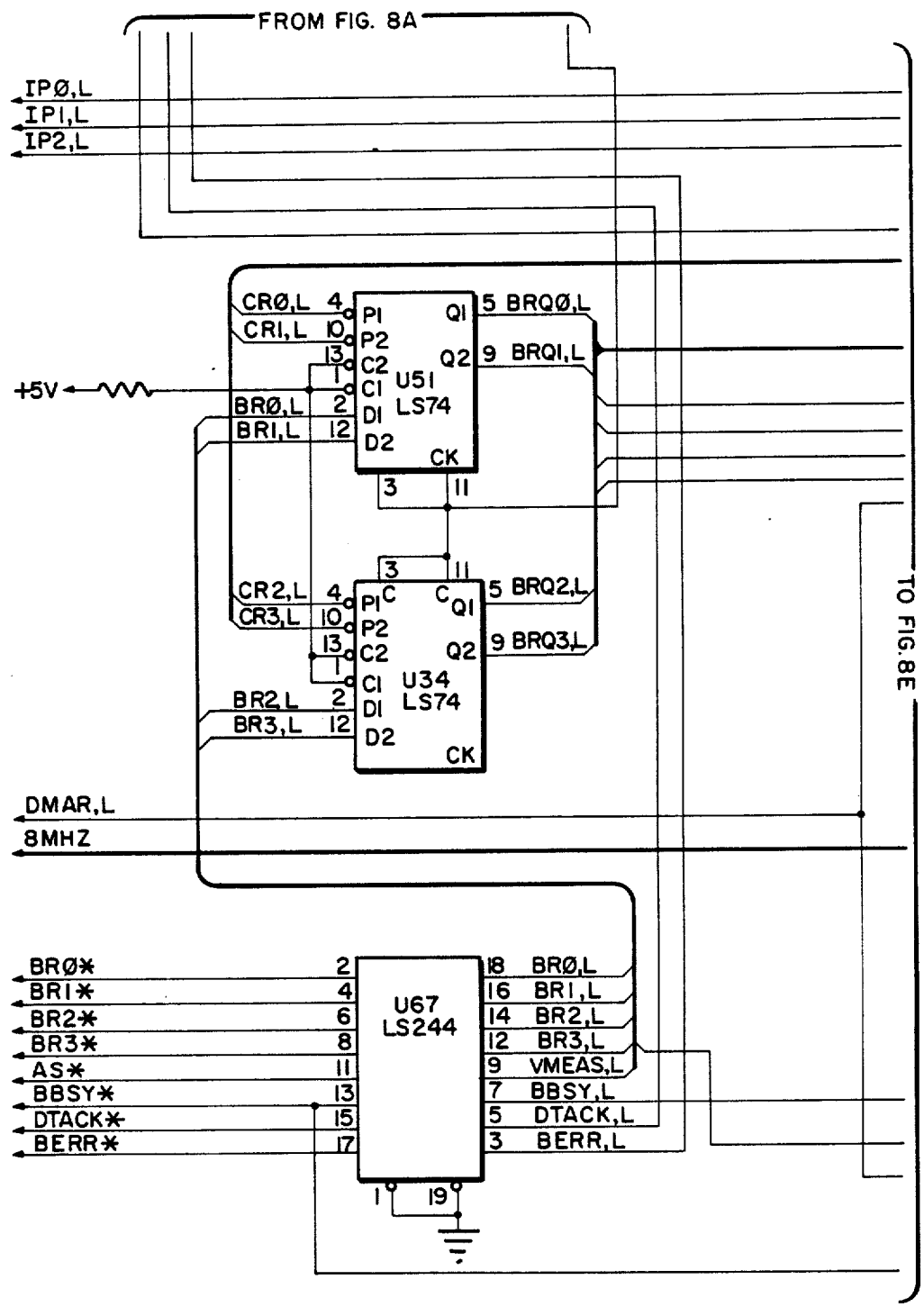
Figure 8E:
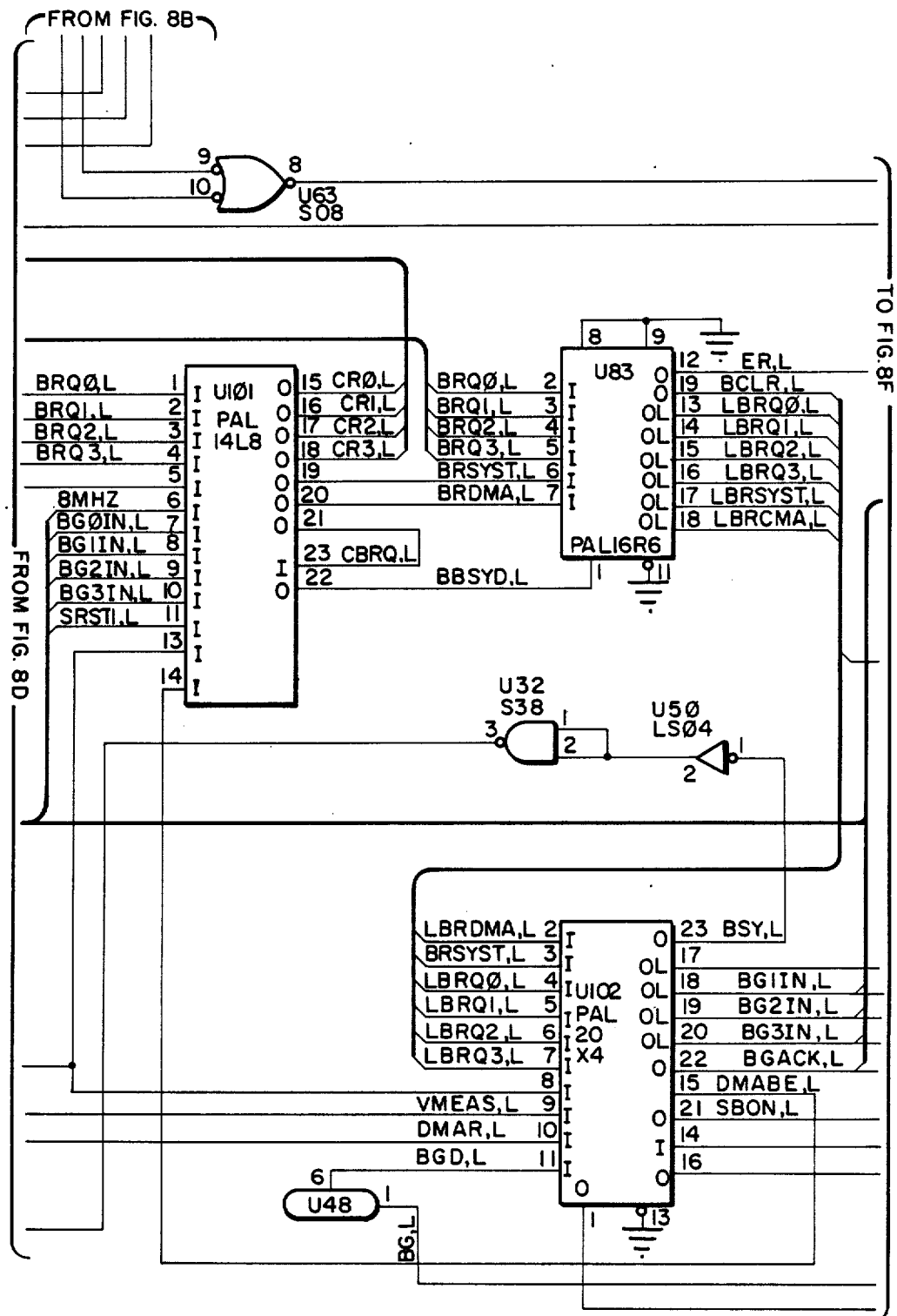
Figure 8F:
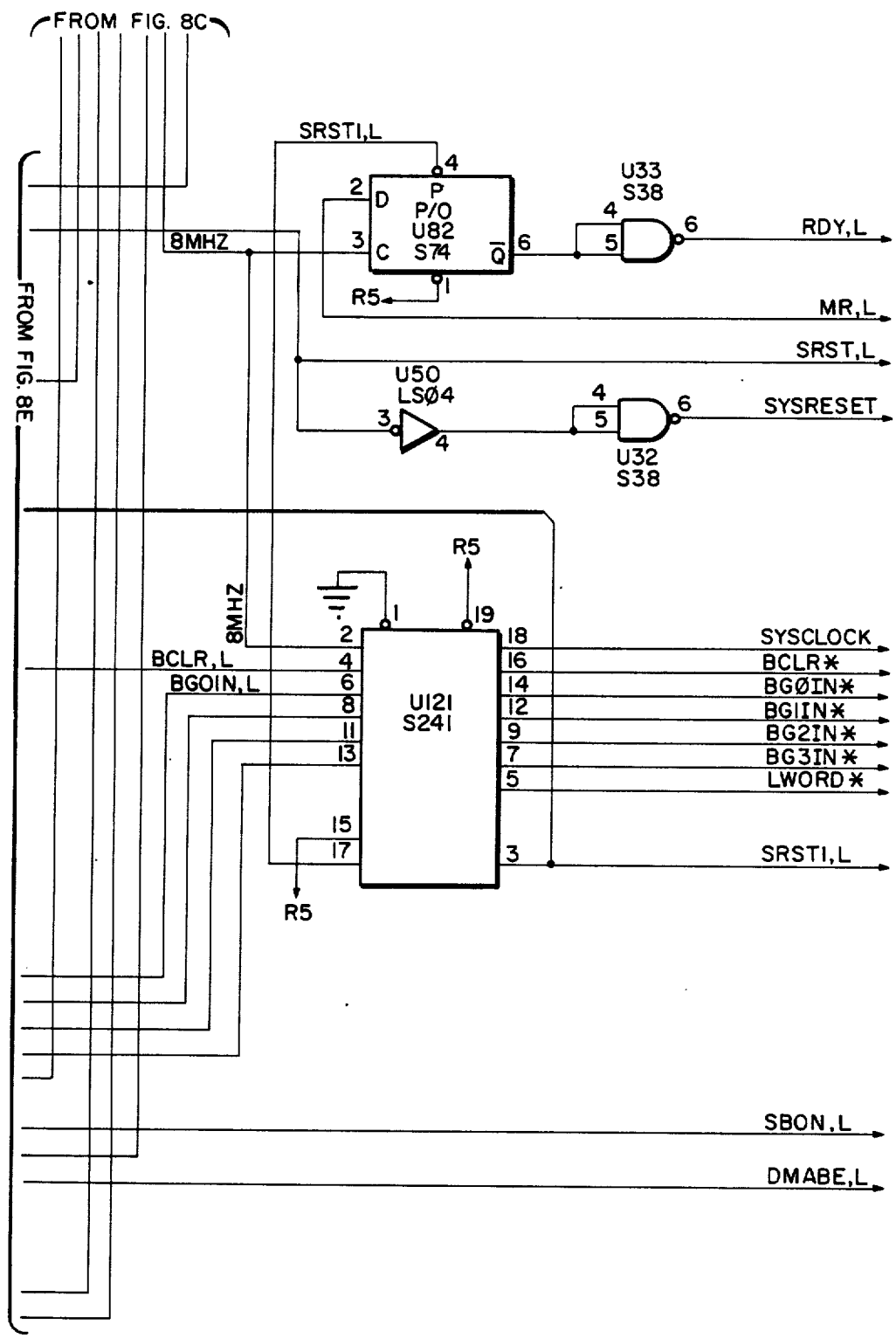
Figure 9A:
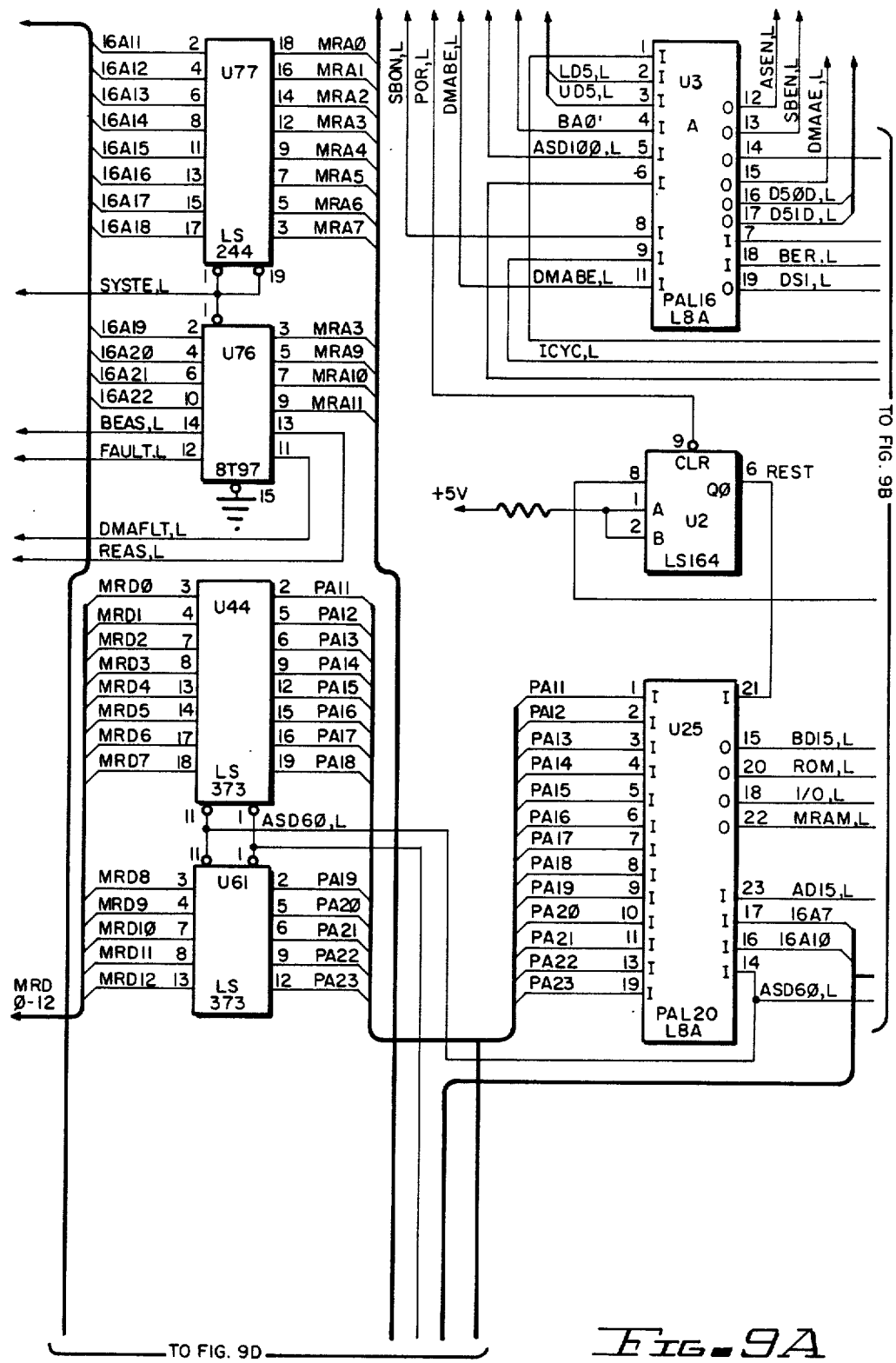
Figure 9B:
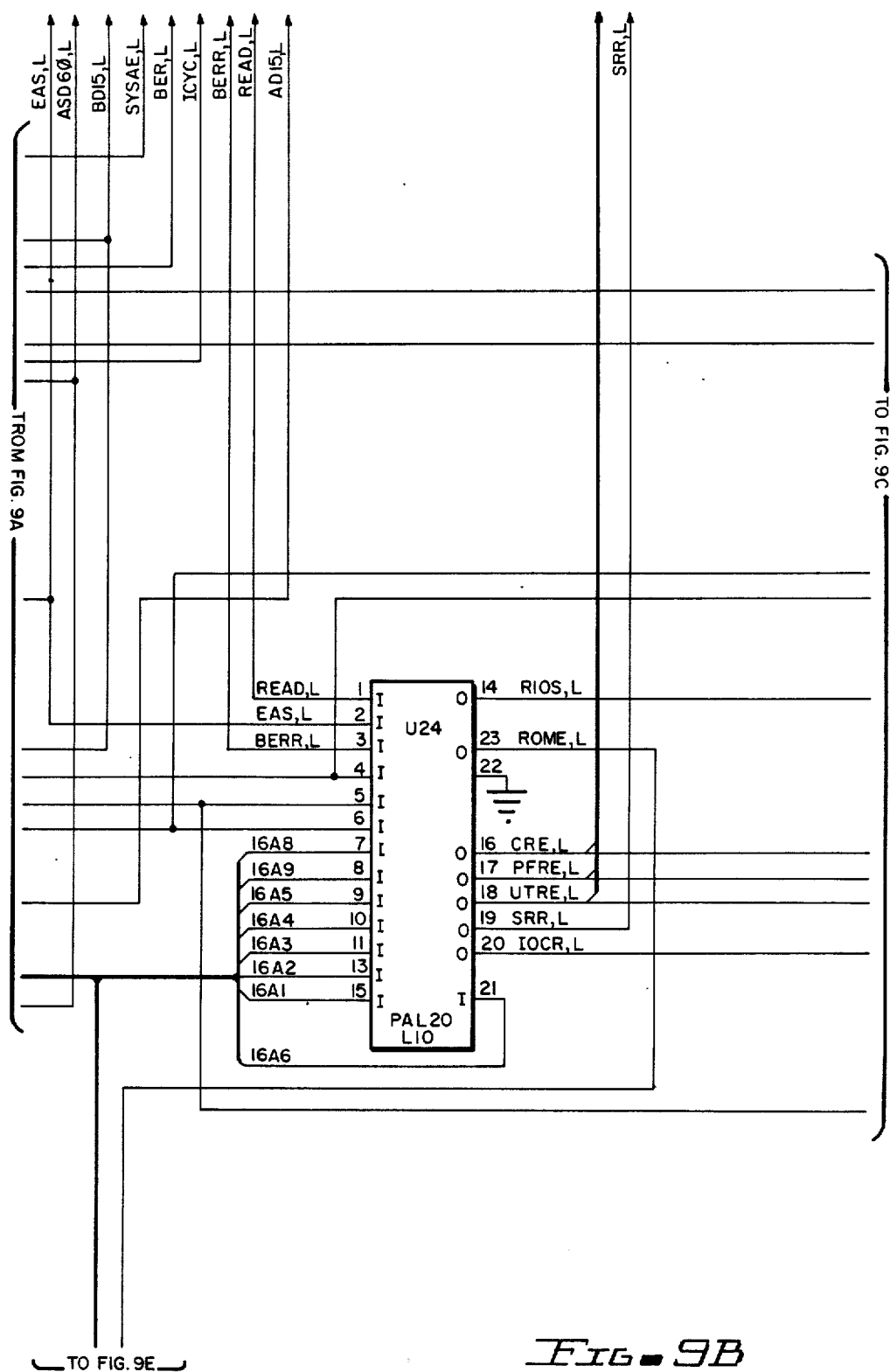
Figure 9C:
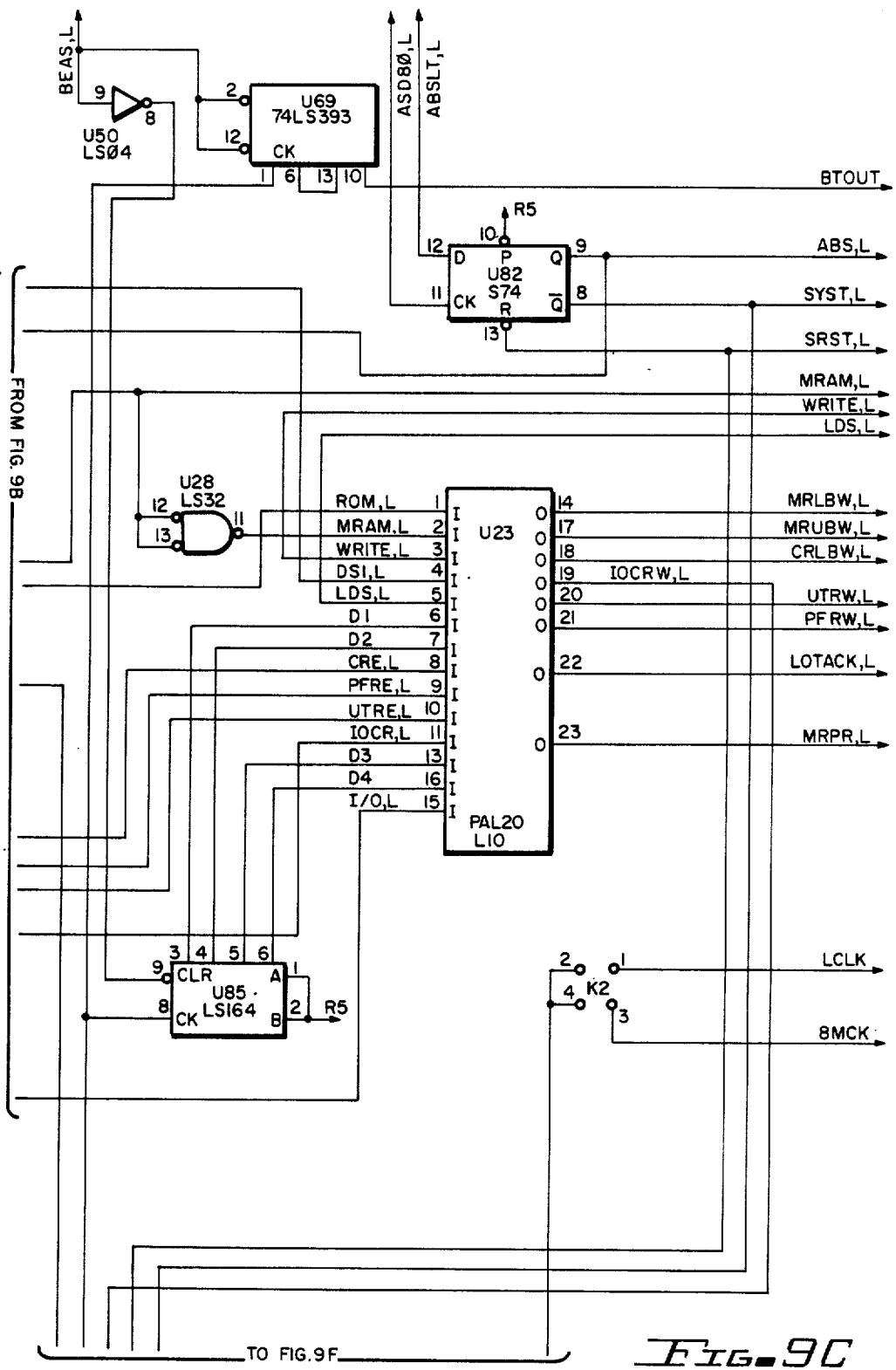
Figure 9D:
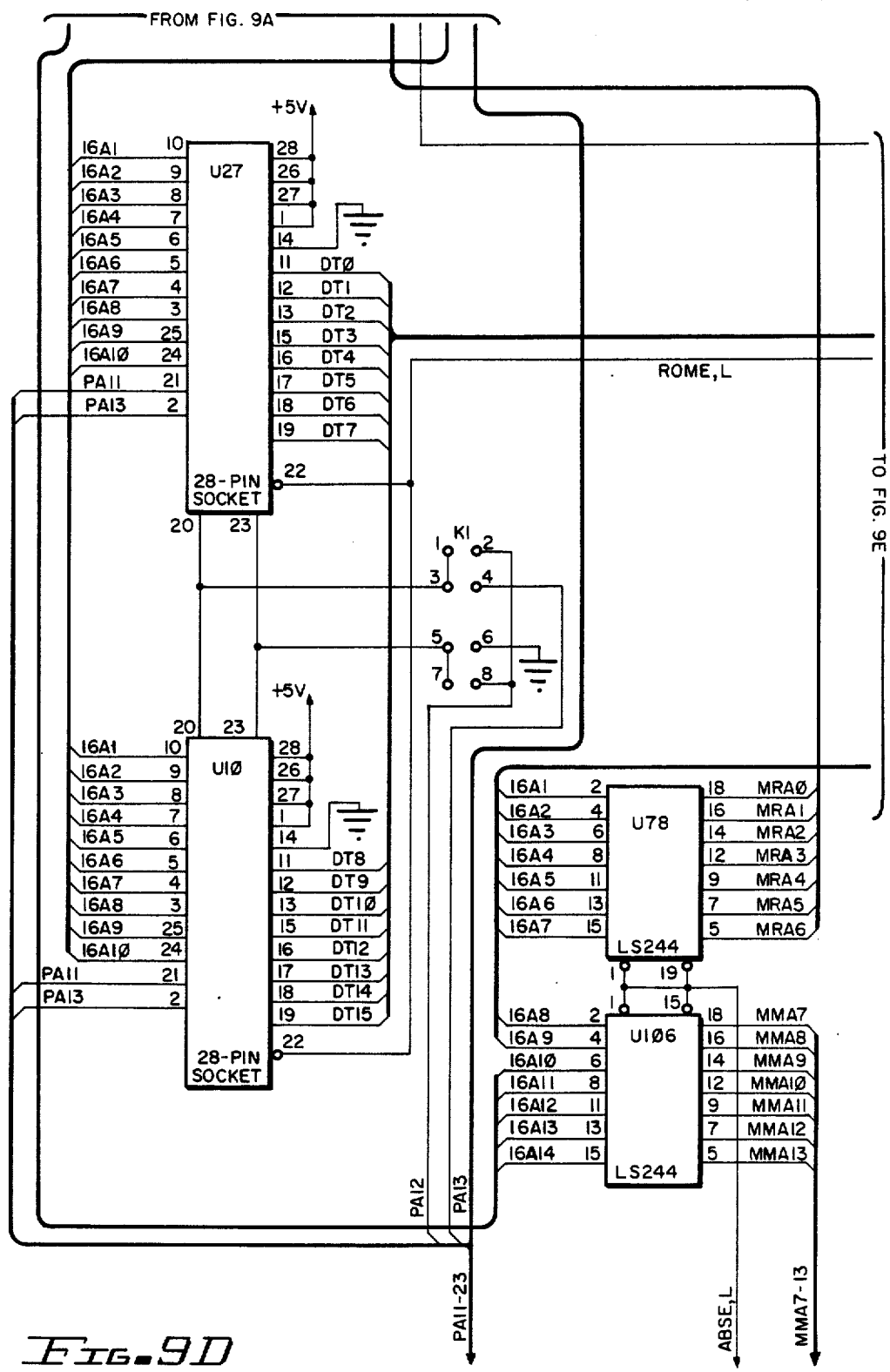
Figure 9E:
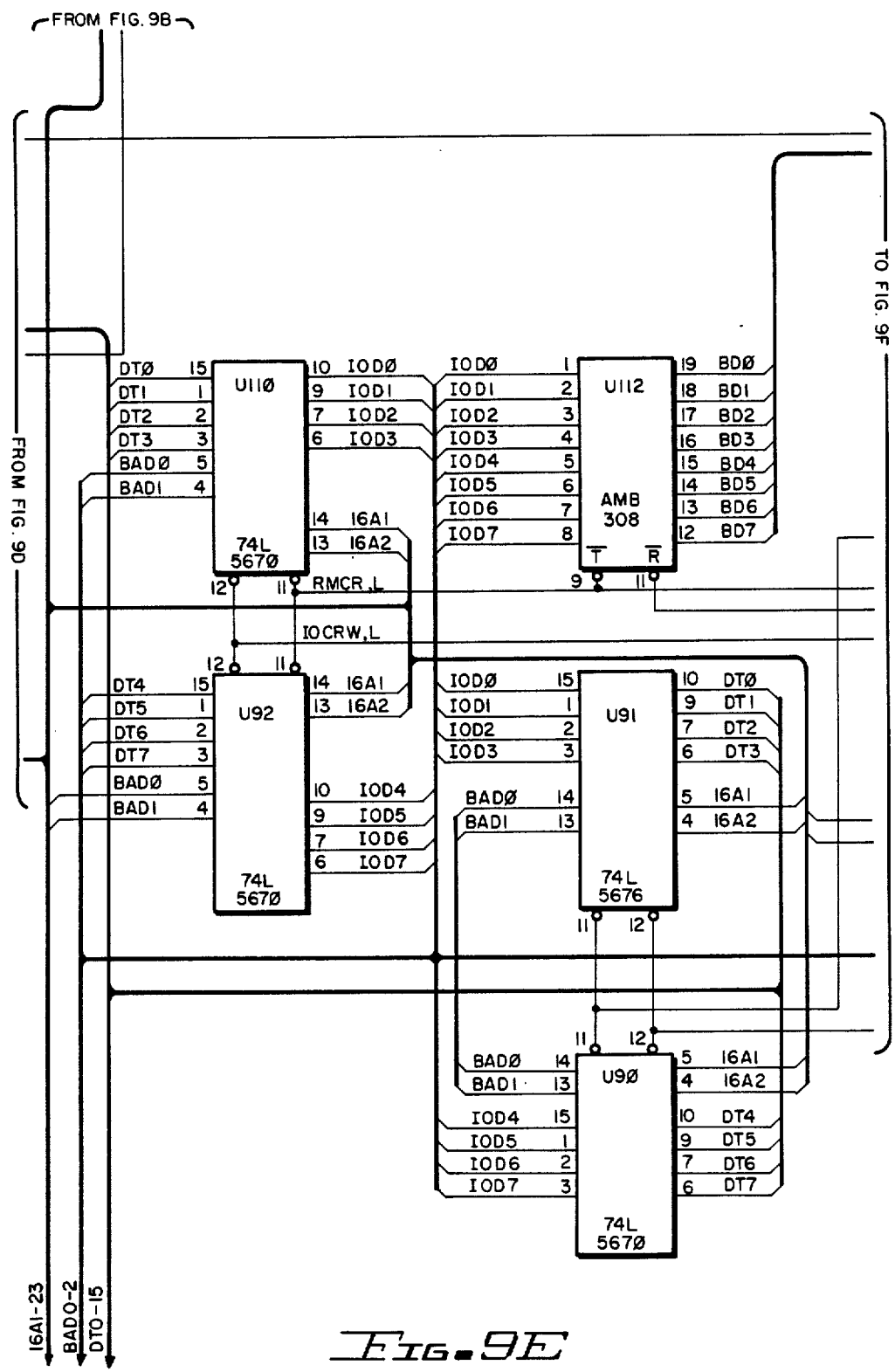
Figure 9F:
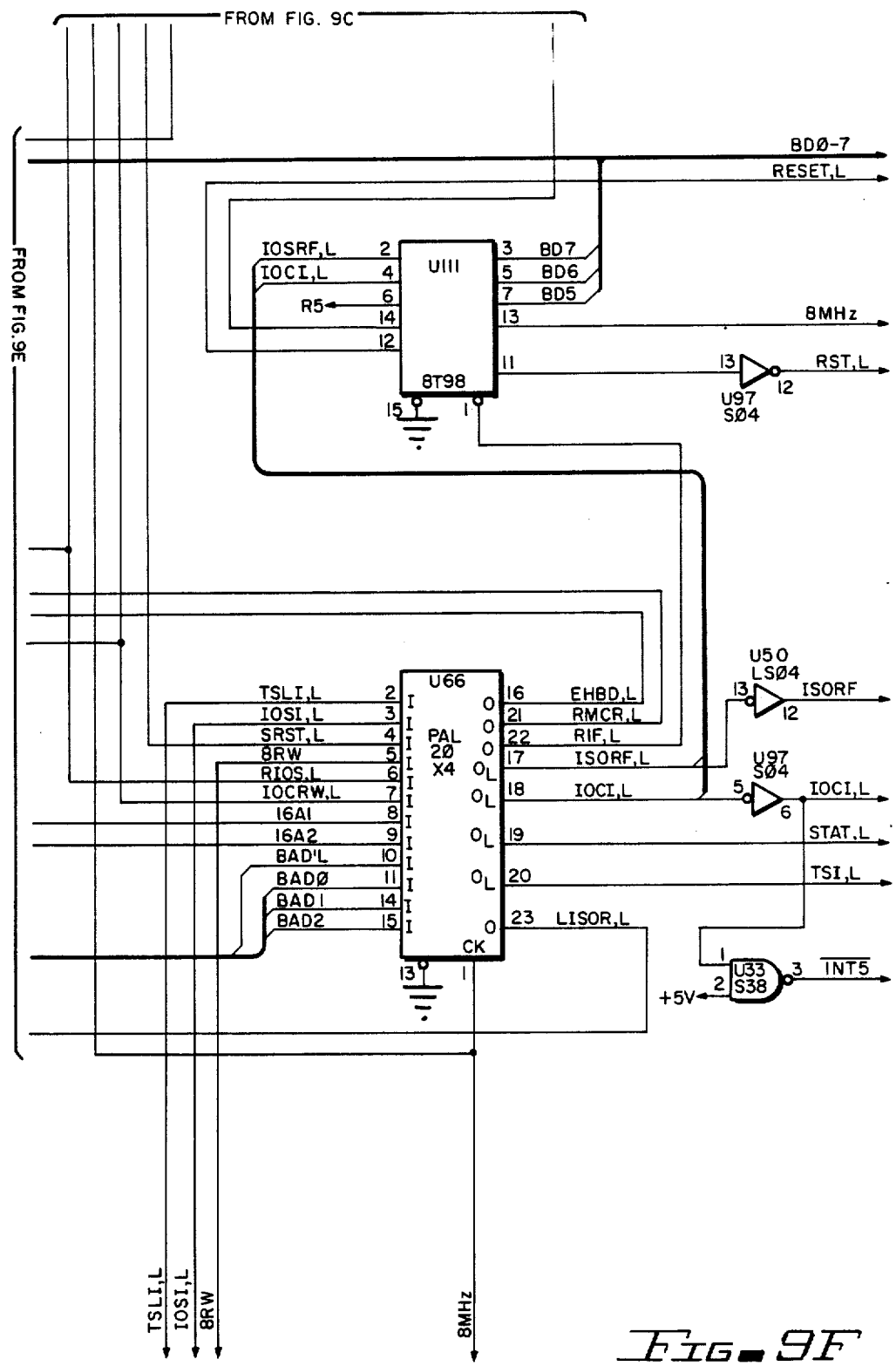

MMU 12 has four main registers: a task register 82, a page file register 88, a system status register 96, and a system control register (refer to FIG. 4A). Only the operating system is allowed to manipulate the MMU registers.

The task register 82 is an 8-bit read/write register. It contains a value equal to the present task. Only seven bits are used, 0-6, for up to 127 process spaces.

The page file register CPFR7 88 is 3-bit read/write register. The contents of this register identify the range of pages contained in a task. This register is initialized to zero at power-up. Its value is maintained at zero when CPU function code lines indicate supervisory mode.

The number of pages per process (task) is derived from the contents of the "PFR" as follows:

| PFR VAL | |
|---|---|
| 0 = 4096 pages; | 4 process spaces |
| 1 = 2048 pages; | 8 process spaces |
| 2 = 1024 pages; | 16 process spaces |
| 3 = 512 pages; | 32 process spaces |
| 4 = 256 pages; | 64 process spaces |
| 5 = 128 pages; | 128 process spaces |
| 6 & 7 = illegal; | |

Power up or reset clears the page file register.

The system status register is an 8-bit read only register. Bits in the system status register are used to save faults, which are cleared during the ACK cycle of the exception processing.

Bits are utilized as follows:

| | |
|---|---|
| Bit 0 = IOCIF | I/O Command flag. When set, indicates command pending to I/O system. It is cleared by read operations from the I/O system. |
| Bit 1 = IOSI | I/O Status flag. When set, indicates new status from I/O system. Cleared by read operations to the I/O status register #3. |
| Bit 2 = WRTV | Write violation. If set, indicates that the MMU logic detected a write violation access. |
| Bit 3 = PGV | Page violation. If set, indicates that the MMU logic detected a page violation access. |
| Bit 4 = BTOUT | Bus time out. If set, indicates that a device on the bus failed to terminate a bus cycle with DTACK or BUS ERROR. If failure takes place during a DMA transfer, the DMAF bit is also set. |

-continued

| | |
|---|---|
| Bit 5 = DMAF | DMA fault. Set if bits 2 thru 4 and bit 6 become set during DMA transfers. |
| Bit 6 = MRPE | Map RAM parity error. Set if parity error is detected on MMU address translation. |
| Bit 7 = | Not used; |

The system control register provides 8 bits of board level control. It is cleared at power up or by system reset. The bits are utilized as follows:

| | |
|---|---|
| Bit 0 = YGRD | Yellow Guard interrupt mask. |
| Bit 1 = IOSIM | I/O status interrupt mask. |
| Bit 2 = DMAERIM | DMA error interrupt mask. |
| Bit 3 = TSLIM | Time slice interrupt mask. |
| Bit 4 = ABSLT | Absolute. The bit, when clear, maintains the MMU in the ABSOLUTE state. |
| Bit 5 = VMEIM | Vme Interrupt mask. The bit, when set, masks interrupts IRQ1 thru IRQ7 from the 16-bit system bus. |
| Bit 6 = SYSF | System fail. The bit when clear, drives Systemfail line on the bus. Software sets this bit if SST is passed. Thus the Sysfail line is released. It can be used during normal operation to indicate system failure. A cleared bit will drive the on-board LED indicator. |
| Bit 7 = SYSFIM | System fail interrupt mask. This bit, when set, masks Sysfail interrupt. |

Local Resources Map Address 256K words of address space is reserved for on-board resources and 16-bit RAM board registers.

The address assignments are as follows:

| | |
|---|---|
| 7FFF01 | system control register |
| 7FFF03 | system status register |
| 7FFF05 | user task register |
| 7FFF07 | page file register |
| 7FFF11,13,15, & 17 | I/O control register 0,1,2 & 3 |
| 7FFF21,23,25, & 27 | I/O status register 0,1,2, & 3 |
| 7C0000 thru 7C3FFF | Local EPROM (16KB) |
| 7E0000 thru 7E7FFF | MMU MAP RAM (32KB) |

At power up/system reset, the ROM address translates to 000000 in the memory map, allowing the CPU, for four cycles, to fetch initial program counter and stack pointer from ROM.

The first four words in ROM must contain the starting address of the program and initial stack pointer value. After the first four cycles, the on-board EROM is mapped at 7C0000. The operating system must write in RAM addresses of service programs for interrupts.

Address Translation

The eight most significant bits of the look-up table 94 are derived from multiplexer 90, which selects one of the six combinations of address lines and task register bits from task register 82, as indexed by a constant in the page file register 88.

Each combination represents one of 128 possible address spaces and corresponding number of pages. If necessary, user task and system task address space can be different in size.

As much as 4 MB of the low physical address space can be reserved for the operating system. This is called task 0. The contents of the memory map can be altered while in task 0.

Memory Protection

Two attributes per page are provided for memory protection. Attributes bits are part of the look-up table.

When in USER mode, a compare between memory requests and page attributes determine faults. Faults are recorded in the system status register. Depending on the type of faults, an interrupt or a bus error is invoked.

Attributes are the two most significant bits of the look-up table. They are decoded and utilized as follows:

| Bit 14 | Bit 13 | |
|---|---|---|
| 1 | 0 | WRITE PROTECT |
| 0 | 1 | PAGE VIOLATION |
| 1 | 1 | GUARD ZONE |

Write protect allows the MMU logic to check restrictions imposed by the operating system. Attempts by the user to write to a restricted page will force the following:
1. Initiate BUS ERROR (the cycle is aborted).
2. Record the condition in the system status register.

A page violation provides the MMU logic with means for checking and controlling access rights. Pages not initialized are treated as non-existing pages. When in USER mode, attempts to address restricted pages force the following:
1. Initiate BUS ERROR (cycle aborted).
2. Record conditions in system status register.

The operating system sets the guard zone warning attribute in the last page of a user memory. It is used to inform itself that memory space for that user is about to be exceeded. The operating system can then allocate more memory to the process.

Detection of the guard zone warning attribute forces the following:
1. Invoke an INTERRUPT (cycle completed).
2. Record condition in system status register.

The memory map and parity look-up table is implemented with a read/write 16K×15 static RAM.

Byte parity check is performed, and a parity error forces the following:
1. Initiate BUS ERROR (cycle aborted).
2. Record condition in system status register.

The translation RAM output lines are utilized as follows:
  Bit 0 through Bit 12=Physical addresses A11 thru A23
  Bit 13 set HIGH=Page Protect
  Bit 14 set HIGH=Write Protect
  Bits 13 & 14 set HIGH=Guard Zone

Map Ram Addressing

When in ABSOLUTE state, the address decoder monitors logical address lines 15 through 23 for "CS". Lines 1 thru 14 are used to linearly access the 16K words in the map.

When in SYSTEM state, the address decoder monitors physical address lines 15 thru 23 for "CS". If the map is addressing itself, logical address lines 1 thru 14 are used to access the 16K words in the map.

During DMA cycles, DMA faults are detected and treated as follows:

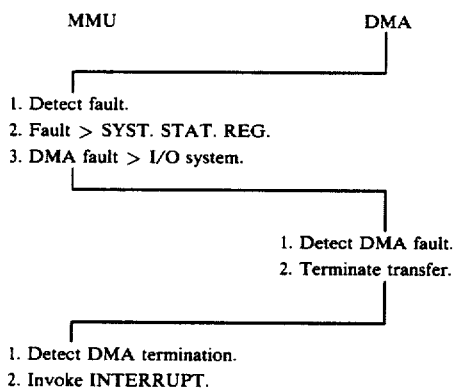

1. Detect fault.
2. Fault > SYST. STAT. REG.
3. DMA fault > I/O system.

1. Detect DMA fault.
2. Terminate transfer.

1. Detect DMA termination.
2. Invoke INTERRUPT.

Regarding DMA addressing, all I/O references are handled by the MMU 12. References can only take place from the logical address side. DMA transfers are always under system control. At the beginning of a DMA cycle, the logical address selected is from the I/O system bus.

MMU States

Address translation from the MMU 12 is a function of the present state. The MMU 12 may be in one of the following states: (1) ABSOLUTE, (2) SYSTEM, (3) DMA, or (4) USER.

Activation of external RESET forces the MMU 12 to enter the ABSOLUTE state. When in ABSOLUTE state, the operation of the map is suspended and the MMU 12 is "backed off" the bus. Then, the 24-bit logical address is mapped unchanged to physical address. From this state, the CPU 5 begins executing initialization routines.

Access to the look-up table is permitted when in ABSOLUTE state. Writing a one to the absolute bit in the system control register forces the MMU 12 to enter the SYSTEM state. Return from ABSOLUTE state is always to SYSTEM state.

When in the SYSTEM state the operating system controls the working environment of the CPU 5, services interrupts, and acts on error conditions.

The SYSTEM state is entered when the task register 82 is set to zero or when exception processing is invoked. The lower 2K of the MAP RAM 94 is referenced for address translation.

Read/write access to the system control register, task register, page file register, task and MAP RAM is allowed in this state. Attempts to access the above while in USER state forces a bus error.

Provision is made to "window" the user memory into the system map. Logical address line A23 is used to switch to/from SYSTEM state. When in SYSTEM state, if A23 is equal to "one", the user memory space is selected according to contents of the user task register. This mechanism allows the system to access user memory for data reference only.

On DMA requests, bus arbitration logic switches the MMU 12 to the DMA state. When the data transfer is completed, it returns to the previous state.

The USER state is entered according to contents of the user task register. Task and context switching is executed under operating system control while in SYSTEM state.

Interrupt Operations

Interrupts and bus errors force exception processing. When the system is interrupted, on-board logic detects CPU SUPERVISORY mode and forces the MMU 12 to enter the SYSTEM state.

Interrupts are divided into two groups: (1) on-board interrupts, and (2) 16-bit system interrupts.

The CPU's seven levels of interrupts are shared by both groups. Within each group, interrupts are serviced in order of priority, level 7 being the highest. On-board interrupts receive higher priority than 16-bit system interrupts.

On-board interrupts include all interrupts other than 16-bit system interrupts. The following interrupts are generated:

| | |
|---|---|
| DMAER | DMA error. Level 2. Invoked at end of DMA transfers if a fault is detected. |
| YGRD | Yellow guard. Level 6. Invoked when a user is is about to run out of memory. |
| SYSFAIL | System fail. Level 1. If not masked, is invoked when 16-bit system bus "Sysfail" is asserted. |
| TSI | Time slice interrupt. Level 5. A signal from the I/O bus is used to invoke this interrupt. The operating system must instruct the I/O system to report at desired intervals. |
| IOSI | I/O status interrupt. Level 4. Invoked by I/O write operations to I/O status register #3. |

For 16-bit system interrupts, seven interrupt lines are provided: IRQ1 through IBQ7. These interrupts belong to group 2. All interrupts pass through the on-board interrupt, handler. During CPU interrupt acknowledge cycles, first the on-board interrupts are checked/serviced, then the 16-bit system interrupts are check/serviced by the priority logic.

The order of priority is descending, IRQ7 being the highest priority interrupt.

Interrupt "vector numbers" are data on the bus during interrupt acknowledge cycles. On-board "vector numbers" are the following:

DMAER=72
YGRD=76
SYSFAIL=71
TSI=75
IOSI=74

Interrupt sequences proceed as follows:

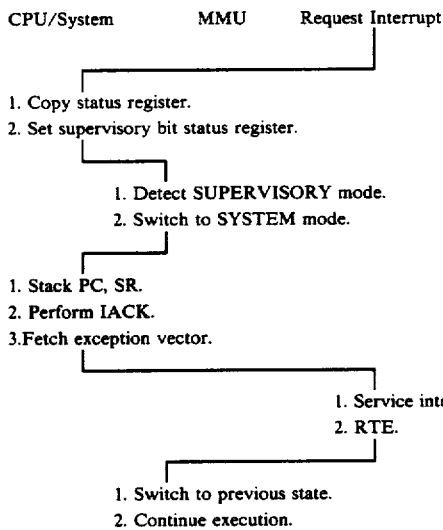

Bus Errors

"Bus error" exception processing is invoked when one or more of the following conditions exist: (1) page violation, (2) write violation, (3) bus time-out, and (4) Map RAM parity error.

System Reset

Three categories of reset are provided: (1) power-on reset (POR), (2) soft reset (software instruction), and (3) hard reset (external).

The CPU board is the 16-bit system controller. As such, the on-board power-up circuit drives the 16-bit system "SYSRESET" for 400 milliseconds. Additionally, all on-board resettable circuitry is cleared. Soft reset is software-controlled. When a reset instruction is executed, all devices are reset, except the CPU 5. Hard rest consists of the external reset switch shared by the system bus.

DTB Requester/Arbiter

This module provides the I/O system and 16-bit system bus masters with means for requesting and gaining bus mastership. Five "DTB" request lines are provided: (1) on-board DMA request, and (2–5) the 16-bit system request lines BR0 through BR3.

The CPU 5 is normally driving the DTB. At the end of each bus cycle, the requester interrogates and latches all the DTB request lines. The arbiter waits for the end of the current bus cycle and grants the DTB in the following priority order: (1) DMA, then (2) BR3–BR0.

When all bus grants are satisfied, the CPU 5 grabs the bus for two cycles, then interrogates the requester again. If no requests are pending, the CPU 5 maintains ownership of the DTB.

MMU State Changes

MMU 12 state changes are implemented by means of hardware built into the CPU 5, which supports a privileged supervisory mode. This mode is called with TRAP instructions for Task/Context switching. Processing of an exception by CPU 5 requires four steps. During the first step, the system makes a temporary copy of the status register and sets it for exception processing. The second step determines the exception vector. The third step saves the current context. Finally, a new context is obtained, and processing is started. When exception processing is completed, the system executes a return from exception (RTE), which pulls the previously stacked PC and SR from the stack and returns control to the interrupted program.

System-to-User Transition

Transition from SYSTEM state to USER state is determined by the TASK REG # and the condition of the S/U bit in the CPU status register. Forcing the CPU to USER state, by means of a privileged instruction operation to the status register, forces the switch.

Typical flow is as follows:

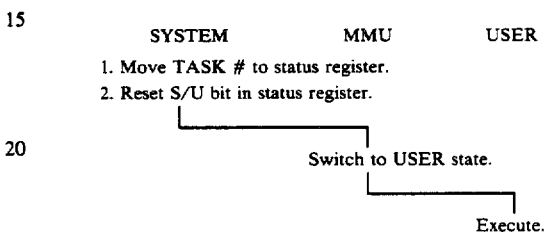

User-to-System Transitions

Trap instructions are the means of getting from the USER to the SYSTEM state.

Trap instructions, when executed, direct program control to a designated routine at the system level. Traps are also used for calling the operating system. A watch-dog timer may also be used to interrupt the system. Processing of this interrupt can be used to force the MMU 12 to the SYSTEM state.

With specific reference to FIGS. 5–9, which comprise the detailed schematic of the CPU printed circuit board, the hardware can be broken into the following modules: (1) processor, power-up, and clock, (2) address decoder, (3) memory management, (4) I/O interface, (5) DTB requester/arbiter, (6) interrupt requester/arbiter, and (7) VME bus interface.

Processor, Power up and Clock

A 8 MHZ 68000 MPU is used. The clock for the 68000 is derived from a 16 MHZ oscillator (U68) and divided by two by U84–5. Internal clock is used only for test or stand alone-applications.

System Reset

The function of U40 is that of a power monitor. At power up, it provides the CPU with a reset condition of a minimum of 200 Msec. This module also provides the address decoder with signal "POR" (power on reset).

Bus Address Strobe

The CPU address strobe signal "AS" is combined with signal "DMAAS" to form bus address strobe early AS (BEAS,L). This signal is delayed by 60 Nsec (ADS60,L) and 100 Nsec (ASD100,L) to allow for MMU propagation delays and for internal timing. "BEAS,L" is made available via connector P2, to the 16-Bit memory to start a memory cycle.

Address Decoder

Interconnected on the internal local bus are MMU, EPROM, system control register, system status register, I/O control register and I/O status register.

IC's U2 and U85 and PAL's U24 and U25 comprise the on-board address decoder. At power-up, signal "REST" from U2 is low for the first four cycles. It forces the EROM address to location "000000" in the memory map, allowing the CPU to fetch the initial program counter and stack pointer.

PAL U23 generates write pulses for all on-board registers, an interrogation signal to MMU parity error, and provides signal "DTACK" to the CPU when local resources are referenced.

MMU Hardware

The MMU hardware consists of the following blocks: (1) page file register (2) task register (3) address multiplexer, and (4) error logic.

The page file register 88 is implemented using an 8219 chip (U70). The register is three bits wide (PF0 thru PF2), connected on the local bus for read/write operation.

The task register 82 is implemented using two 29LS18's (U87,U88). The register is seven bits wide (UT0 through UT6), connected on the local bus for read/write operation.

The Map RAM, U37 thru U43 and U53 thru U60, makes up a 16K×16 bit-wide memory map. U52 and U35 are used for memory map parity check.

Addresses to the Map RAM are made up to two components:
1. MRA0 thru MRA6 are the linear address from the logical address bus. This component comprises a minimum of 128 pages of address space per task.
2. MMA7 thru MMA13 are a combination of logical address lines and task register bits from the MUX logic.

The Map RAM is selected on all bus cycles by signal BEAS,L. Outputs MRD0 thru MRD12 are fed to U44 and U61 and latched on the leading edge of signal ASD60,L. Latched outputs make up the bus physical address.

MMU Mux

The MUX is implemented with high speed PAL's U71, U72, and U73. The logic in the PAL's provides for partitioning the memory map into SYSTEM and USER address space, as specified by bits in the page file register and task register.

Signal FC2 from the CPU is the SUPERVISORY/USER mode flag. When in the SUPERVISORY mode, it forces task "0" to be selected.

When signal DMABE,L is true, the 8-bit system address bus is selected for mapping.

Read/write operations on the Map RAM always take place from the logical address side. Signal ABSE,L from U73 becomes active when the map is accessed in the ABSOLUTE state or the map addresses itself in SYSTEM state. It routes logical address lines 16A1 thru 16A14 to the map, which is then linearly accessed.

MMU Error Logic

PAL's U13, U16, and U18 make up the error detection logic for the MMU. U15, during bus cycles, monitors bits FLAG 1 and FLAG 2 from the Map RAM. If not in ABSOLUTE state and not in Supervisory mode, error conditions are detected. Faults are stored in the system status register, and Bus Error is invoked.

The system status register comprises U6, U7, and U8. Error conditions are saved until read by the operating system.

PAL U16 provides a function of monitoring and control. It monitors error flags, system state flag (SYST,L), and the interrupt acknowledge cycles (ICYC,L).

DTB Requester Arbiter

Bus allocation logic is implemented with U51, U34, U101, U102, and U83. The logic responds to bus requests and optimizes usage in the allocation process.

IC's U51, U34, U101, and U83 comprise the DTB requester. It accepts requests on lines BR0* thru BR3* and lines BRSYST,L and BRDMA,L. Each request line has a corresponding grant line: "BG0IN*" thru "BG3IN*", system bus grant (SBON,L) and DMA bus grant (DMABE,L).

At the end of each bus cycle any 16-bit system requests are latched in U34 and U51. The latched requests, together with DMA request DMAR,L are presented to U83 by PAL U101.

U83's function is that of prioritization. DMA requests receive highest priority. Signal bus clear (BCLR*), informs the present bus master that a DMA request is pending and should release the bus immediately.

Interrupt Requester/Handler

The CPU on-board interrupt requester can be interrupted both from the 16-bit system and from on-board interrupts. Therefore, two groups of interrupts can be processed: (1) Group "A", consisting of five internally generated interrupts, and (2) Group "B", consisting of seven 16-bit system interrupt request lines (IRQ1* thru IRQ7*).

Both groups share the CPU seven levels of interrupts. However, any group "A" interrupt is given priority over group "B" interrupts by the interrupt handler.

PAL U22 makes up the on-board interrupter. It consists of combination logic and latches to provide for five sources of interrupts. Inputs to U22 consist of all necessary signals for latching the following interrupt requests:
1. DMAER,L—DMA Error. Invoked when faults are detected during DMA memory transfers.
2. TSLI,L—Time slice. Invoked on timer report from I/O system.
3. IOSI,L—I/O status. Invoked on status report from I/O system.
4. YGRD,L—Yellow Guard. Invoked when a current user is about to run out of memory for more allocation.
5. SYSTF,L—System fail. Invoked when 16-bit system bus signal "SYSFAIL" is asserted.

The above interrupt requests are latched at the end of the current bus cycle by clock ICK. CPU address lines 16A1 thru 16A3 are also inputted to U22. During an interrupt acknowledge cycle they show the level of interrupt being acknowledged.

U120 checks all internal interrupts against their respective mask bit, as set by the operating system in the system control register, then feeds requests to U118 and U81.

U118 checks for masked 16-bit system interrupt requests, IRQ1* thru IRQ7*, by bit mask VMEIM. Then it performs a logical "OR" between internal and 16-bit system requests and outputs requests on their respective level.

U100 accepts the seven interrupt levels, does a priority check, latches requests and outputs the encoded level of the requesting interrupt device on lines IPL0 thru IPL2 going to the CPU.

U81 monitors internal interrupt requests. During CPU interrupt ACK cycles, it compares the interrupt level presented on lines 16A1 thru 16A3 with the current level of on-board request to determine if a match exists. If no match is found, interrupt ACK signal (IACK*) is asserted to the 16-bit system bus. If a match is found, the following signals are generated:

1. LIV,L—Local interrupt vector. Fed to on-board interrupter U22 for acknowledgement.
2. LIVF,L—Local interrupt vector fetch. Used to enable vector register U26.
3. IDTACK,L—Interrupt data ACK asserted to the CPU to inform that a valid interrupt vector number is on the data bus.

I/O Interface Module

The I/O interface module provides the data path between the 8-bit I/O system and the 16-bit memory.

All data movement is via DMA. This interface does not become active until the on-board requester grants the 16-bit system bus (DMABE,L). While waiting for the condition to be met, all input/output buffers connected to the I/O system are held in the high impedance state.

DMA requests are initiated by the I/O system when signals VME,L, STAT0,L and MREQ,L are asserted. The signals are monitored by PAL U65. When true, U65 asserts DMA bus request (DMAR,L) to the on-board requester. Additionally, U65 asserts Memory Ready (MR,L) which is synched with the 8 Mck I/O clock at U82-6. U82-6 thru U33-6 is fed to the I/O system for stretching of the memory cycle while waiting for granting of the DTB.

After the DTB is granted and the memory cycle is completed, "MR,L" is released, and the cycle is terminated. The maximum cycle-stretching is 4 microseconds. When bus faults occur, "MR,L" is released by bus time-out (BT0,L).

PAL U3, during DMA cycles, uses "DMAAS,L" and 8A0 to generate bus data strobe "DS0D,L" and "DS1D,L".

16-Bit System Bus Interface

All data transfers occur between a bus master and memory. The CPU or DMAC initiates data transfers. Memory must acknowledge transfers. Due to the asynchronous bus, the slave controls the amount of the time taken to complete data transfers.

The 16-bit system bus is a high speed asynchronous data bus, used by the CPU or DMAC, having a 16 MB address range (23 address lines). It has 16 data lines (permitting word/byte data transfers).

The master driven lines are as follows:

| A1 thru A23 | address bus |
| D0 thru D15 | data bus |
| FC0 thru FC2 | function codes |
| AS | address strobe |
| DS0 | odd byte data strobe |
| DS1 | even byte data strobe |
| WRITE | read/write line |
| IACK | interrupt acknowledge cycle |
| BG0IN thru BG3IN | DTB grant lines |

The slave (memory) driven lines comprise:

| DTACK | data acknowledge (successful transfer) |
| BUS ERROR | error detected |

Bus arbitration logic prevents simultaneous access of the DRB by two masters, and schedules requests from multiple users to optimize bus usage.

Bus arbitration lines are:

| 5 bus request lines, | DMA and BR0 thru BR3 |
| 1 memory ready line, | RDY |
| 4 bus grant lines, | BG0OUT thru BG3OUT |
| 1 bus clear line, | BCLR |
| 1 bus busy line, | BBSY |

Arbitration modules are:
REQUESTER—Accepts DMA want bus and 16-bit system bus requests for presentation to arbiter.
ARBITER—Prioritizes incoming bus request and grants DTB to appropriate requester.

It will be apparent to those skilled in the art that the disclosed Memory Management Unit With Dynamic Page Allocation may be modified in numerous ways and may assume many embodiments other than the preferred form specifically set out and described above.

Accordingly, it is intended by the appended claims to cover all modifications of the invention which fall within the true spirit and scope of the invention.

A-1

APPENDIX A

PARTS LIST
(I.C.'s)

| Part No. | Commercial No. |
|----------|----------------|
| U2 | 74LS164 |
| U6 | 74LS74 |
| U7 | 74LS74 |
| U8 | 74LS74 |
| U11 | 2919 |
| U12 | 2919 |
| U13 | 74LS244 |
| U19 | 74LS04 |
| U26 | 74LS244 |
| U28 | 74LS32 |
| U29 | 74S32 |
| U30 | 74LS74 |
| U32 | 74S38 |
| U33 | 74S38 |
| U34 | 74LS74 |
| U35 | PD2167-3 |
| U36 | PD2167-3 |
| U37 | PD2167-3 |
| U38 | PD2167-3 |
| U39 | PD2167-3 |
| U40 | PD2167-3 |
| U41 | PD2167-3 |
| U42 | PD2167-3 |
| U43 | PD2167-3 |
| U44 | 74LS373 |
| U45 | 8T97 |

| Part No. | Commercial No. |
|---|---|
| U46 | MC68010L8 |
| U47 | Delay Line |
| U48 | Delay Line |
| U49 | MC1455 |
| U50 | 74LS04 |
| U51 | 74LS74 |
| U52 | PD2167-3 |
| U53 | PD2167-3 |
| U54 | PD2167-3 |
| U55 | PD2167-3 |
| U56 | PD2167-3 |
| U57 | PD2167-3 |
| U58 | PD2167-3 |
| U59 | PD2167-3 |
| U60 | PD2167-3 |
| U61 | 74LS373 |
| U62 | 74LS244 |
| U63 | 74S08 |
| U64 | 74S15 |
| U67 | 74LS244 |
| U69 | 74LS393 |
| U70 | 2919 |
| U74 | 74S240 |
| U75 | 74LS244 |
| U76 | 8T97 |
| U77 | 74LS244 |
| U78 | 74LS244 |
| U79 | 74LS245 |
| U82 | 74S74 |
| U84 | 74S74 |
| U85 | 74LS164 |
| U86 | 74LS244 |
| U87 | 29LS18 |
| U88 | 29LS18 |
| U90 | 74LS670 |
| U91 | 74LS670 |
| U92 | 74LS670 |
| U93 | 72S280 |
| U94 | 74S280 |
| U95 | 74LS245 |
| U96 | 74LS245 |
| U97 | 74S04 |
| U97 | Hex Inverter 74AS04 |
| U98 | 74LS245 |
| U99 | 8308 |
| U103 | 74S244 |
| U104 | 74S244 |
| U105 | 74S244 |
| U107 | 8T97 |
| U108 | 8T97 |
| U109 | 74LS04 |
| U110 | 74LS670 |
| U111 | 8T98 |
| U112 | 8308 |
| U113 | 74LS645-1 |
| U114 | 74LS645-1 |
| U115 | 74S244 |
| U116 | 74S244 |
| U117 | 74S244 |
| U119 | 8308 |
| U121 | 74S241 |

B-1

APPENDIX B

PARTS LIST
(Programmable I.C.'s)

Part No: U3 (PAL16L8A)
Part Type: Programmable Array Logic (PAL)
Function: VME Bus Control
Program:

```
+XPLOT
#P
 00  ----  ----  ----  ----  ----  ----  ----  ----
 01  ----  ----  -X--  ----  -X--  ----  ----  ---X
 02  ----  -X--  ----  ----  -X--  ----  ----  ----
 16  ----  ----  ----  ----  ----  ----  ----  ----
 17  ----  ----  -X--  -X--  -X--  X---  ----  ---X
 18  ----  -XX-  ----  -X--  ----  X---  ----  ----
 24  ----  ----  ----  ----  ----  ----  ----  ----
 25  ----  ----  X---  -X--  -X--  X---  ----  ---X
 26  -X--  --X-  ----  -X--  ----  X---  ----  ----
 32  ----  ----  ----  ----  ----  ----  ----  ----
 33  --X-  ----  ----  ----  ----  ----  ----  ---X
 40  ----  ----  ----  ----  ----  ----  ----  ----
 41  --X-  ----  ----  ----  ----  ----  -X--  ---X
 48  ----  ----  ----  ----  ----  ----  ----  ----
 49  -X--  ----  ----  ----  ----  ----  -X--  X---
 56  ----  ----  ----  ----  ----  ----  ----  ----
 57  --X-  --X-  ----  ----  -X--  X---  ----  ----
 58  --X-  --X-  ----  -X--  ----  X---  ----  ----
```

B-2

Part No:      U15 (PAL16L8A)
Part Type:    PAL
Function:     MMU Error Logic
Program:

```
+XPLOT
#P
  00  ----  ----  ----  ----  ----  ----  ----  ----
  01  -X--  --X-  ----  ----  -X--  ----  ----  ----
  02  -X--  ----  ----  ----  ----  ----  ----  X---
  03  -X--  X-X-  -X--  ----  ----  ----  ----  ---X
  04  -X--  -XX-  X---  ----  ----  -X--  ----  ---X
  05  -X--  --X-  ----  -X--  ----  ----  X---  ---X
  16  ----  ----  ----  ----  ----  ----  ----  ----
  17  -XX-  X---  X---  ----  ----  ----  X---  ---X
  24  ----  ----  ----  ----  ----  ----  ----  ----
  25  -X--  --X-  ----  ----  -X--  ----  ----  ----
  32  ----  ----  ----  ----  ----  ----  ----  ----
  33  -X--  ----  ----  ----  ----  ----  ----  X---
  40  ----  ----  ----  ----  ----  ----  ----  ----
  41  -X--  X---  ----  ----  ----  ----  -X--  ----
  42  -X--  ----  X---  ----  ----  ----  -X--  ----
  43  -X--  ----  ----  ----  ----  ----  -X--  X---
  44  -X--  ----  ----  ---X  ----  ----  -X--  ----
  45  ---X  ----  ----  ----  ----  ----  -X--  ----
  48  ----  ----  ----  ----  ----  ----  ----  ----
  49  -X--  -XX-  X---  ----  ----  -X--  ----  ---X
  56  ----  ----  ----  ----  ----  ----  ----  ----
  57  -X--  X-X-  -X--  ----  ----  ----  ----  ---X
  58  -X--  --X-  ----  -X--  ----  ----  X---  ---X
```

B-3

Part No:      U16 (PAL16L8A)
Part Type:    PAL
Function:     System Status
Program:

```
+XPLOT
#P
  00  ----  ----  ----  ----  ----  ----  ----  ----
  01  -X--  ----  ----  ----  ----  ----  --X-  ----
  02  X---  ----  ----  ----  ----  ----  ----  ----
  08  ----  ----  ----  ----  ----  ----  ----  ----
  09  ----  ----  ----  ----  -X--  ----  ----  ----
  10  ---X  ----  ----  ----  ----  ----  ----  ----
  16  ----  ----  ----  ----  ----  ----  ----  ----
  17  ----  ----  ----  ----  ----  ----  ----  --X-
  24  ----  ----  ----  ----  ----  ----  ----  ----
  25  ----  ----  X---  ----  ----  ----  ----  ----
  26  ----  ----  ----  ----  -X--  ----  ----  ----
  32  ----  ----  ----  ----  ----  ----  ----  ----
  33  ----  -X--  ----  ----  ----  ----  ----  ---X
  34  -X--  ----  ----  ----  ----  ----  ---X  ----
  35  -X--  ----  X---  ----  ----  ----  ----  ----
  56  ----  ----  ----  ----  ----  ----  ----  ----
  57  --X-  ----  ----  ----  ----  ----  --X-  ----
```

B-4

Part No:     U18 (PAL16L8A)
Part Type:   PAL
Function:    Common Logic
Program:

```
+XPLOT
#0
#F00  ----  ----  ----  ----  ----  ----  ----  ----
  01  -X--  ----  ----  ----  -X--  ----  ----  ----
  08  ----  ----  ----  ----  ----  ----  ----  ----
  09  ----  ----  ----  ----  ----  -X--  ----  ----
  10  ----  ----  ----  ----  ----  ----  -X--  ----
  16  ----  ----  ----  ----  ----  ----  ----  ----
  17  ----  ----  ----  ----  ---X  ----  ----  ---X
  18  ----  ----  ----  ---X  ---X  ----  ----  ----
  40  ----  ----  ----  ----  ----  ----  ----  ----
  41  ---X  ----  ----  ----  -X--  ----  ----  ----
  48  ----  ----  ----  ----  ----  ----  ----  ----
  49  ----  -X--  ----  ----  -X--  ----  ----  ----
  56  ----  ----  ----  ----  ----  ----  ----  ----
  57  ----  ----  X---  ----  ----  -X--  ----  ----
  58  ----  ----  ----  -X--  ----  X---  ----  ----
```

B-5

Part No:     U22 (PAL20X8)
Part Type:   PAL
Function:    Interrupt Requester
Program:

```
+XPLOT
#P
  32  ----  ----  ----  ----  ----  ----  -X--  ----  --X-
  33  ----  ----  ----  ----  ---X  ----  ----  ----  --X-
  34  -X--  -X--  X---  -X--  ---X  ----  ----  ----  --X-
  40  ----  ----  ----  ----  X---  ----  ----  -X--  --X-
  41  ----  ----  ----  ----  X---  ---X  ----  ----  --X-
  42  X---  -X--  -X--  -X--  X---  ---X  ----  ----  --X-
  48  ----  ----  ----  ----  ----  -X--  ----  ----  --X-
  49  ----  ----  ----  ----  ----  ----  ---X  ----  --X-
  50  X---  -X--  X---  -X--  ----  ----  ---X  ----  --X-
  56  ---X  ----  ----  ----  ----  ----  ----  ----  -XX-
  57  ---X  ----  ----  ----  ----  ----  ---X  ----  --X-
  58  -X-X  X---  X---  -X--  ----  ----  ---X  ----  --X-
  64  ----  ----  ----  ----  -X--  ----  ----  ----  --X-
  65  ----  ----  ----  ----  ----  ----  ----  ---X  --X-
  66  -X--  X---  -X--  -X--  ----  ----  ----  ---X  --X-
```

B-6

Part No:      U23 (PAL20L10)
Part Type:    PAL
Function:     Address Decode, Level 3
Program:

```
+XPLOT
#P
  00  ---- ---- ---- ---- ---- ---- ---- ---- ---- ----
  01  ---- X--- ---- ---- ---- X--- ---- ---- ---- ---X
  08  ---- ---- ---- ---- ---- ---- ---- ---- ---- ----
  09  ---- ---- ---- ---- ---- ---- ---- --X- ---X ----
  10  -X-- ---- ---- ---- ---- ---- ---- --X- ---- ----
  11  ---X ---- ---- ---- ---- ---- ---- --X- ---- ----
  16  ---- ---- ---- ---- ---- ---- ---- ---- ---- ----
  17  ---- -X-- ---- -X-- X--- X--- ---- -X-- ---- ---X
  24  ---- ---- ---- ---- ---- ---- ---- ---- ---- ----
  25  ---- -X-- ---- -X-- X--- X--- ---- ---- -X-- ---X
  32  ---- ---- ---- ---- ---- ---- ---- ---- ---- ----
  33  ---- -X-- ---- -X-- X--- X--- ---- ---- ---- -X-X
  40  ---- ---- ---- ---- ---- ---- ---- ---- ---- ----
  41  ---- -X-- ---- -X-- X--- X--- -X-- ---- ---- ---X
  48  ---- ---- ---- ---- ---- ---- ---- ---- ---- ----
  49  -X-- -X-- -X-- ---- X--- X--- ---- ---- ---- ---X
  72  ---- ---- ---- ---- ---- ---- ---- ---- ---- ----
  73  -X-- -X-- ---- -X-- X--- X--- ---- ---- ---- ---X
```

B-7

Part No:      U24 (PAL20L10)
Part Type:    PAL
Function:     Address Decode, Level 2
Program:

```
+XPLOT
#P
  00  ---- ---- ---- ---- ---- ---- ---- ---- ---- ----
  01  ---- ---- -X-- ---- ---- ---- ---- ---- ---- ----
  24  ---- ---- ---- ---- ---- ---- ---- ---- ---- ----
  25  -X-- ---- ---X -X-- ---- X--- X--- -X-- X--- -X--
  32  ---- ---- ---- ---- ---- ---- ---- ---- ---- ----
  33  -X-X ---- ---X -X-- ---- X--- X--- -X-- -XX- -X-X
  40  ---- ---- ---- ---- ---- ---- ---- ---- ---- ----
  41  -X-- ---- ---X -X-- ---- X--- X--- -X-- -X-X -XX-
  48  ---- ---- ---- ---- ---- ---- ---- ---- ---- ----
  49  -X-- ---- ---X -X-- ---- X--- X--- -X-- -XX- -XX-
  56  ---- ---- ---- ---- ---- ---- ---- ---- ---- ----
  57  -X-- ---- ---X -X-- ---- X--- X--- -X-- -X-X -X-X
  72  ---- ---- ---- ---- ---- ---- ---- ---- ---- ----
  73  -X-X ---- ---X -X-- ---- X--- X--- X--- -X-- -X--
```

B-8

Part No:     U25 (PAL20L8A)
Part Type:   PAL
Function:    Address Decode Level 1
Program:

```
+XPLOT
#P
 08  ----  ----  ----  ----  ----  ----  ----  ----  ----  ----
 09  ----  --X-  --X-  -X--  -X-X  X---  X---  X---  X--X  X-X-
 24  ----  ----  ----  ----  ----  ----  ----  ----  ----  ----
 25  ----  --X-  --X-  -X--  -X-X  -X--  X---  X---  X--X  X-X-
 26  ----  ----  ---X  ----  ----  ----  ----  ----  ---X  ----
 40  ----  ----  ----  ----  ----  ----  ----  ----  ----  ----
 41  X-X-  X-X-  X-X-  X---  X--X  X---  X--X  X-X-  X--X  X-X-
 64  ----  ----  ----  ----  ----  ----  ----  ----  ----  ----
 65  ----  --X-  --X-  -X--  -X-X  ----  X---  X---  X--X  X-X-
 66  X-X-  X-X-  X-X-  X---  X--X  X---  X--X  X-X-  X--X  X-X-
 67  ----  ----  ---X  ----  ----  ----  ----  ----  ---X  ----
```

B-9

Part No:     U65 (PAL20L10)
Part Type:   PAL
Function:    Bus Interface
Program:

```
+XPLOT
#P
 08  ----  ----  ----  ----  ----  ----  ----  ----  ----  ----
 09  ----  ----  ----  ----  ----  ----  ----  ----  -X--  -X--
 16  ----  ----  ----  ----  ----  ----  ----  ----  ----  ----
 17  ----  ----  ----  ----  X---  ----  X---  -X--  -X--  -X--
 18  ----  ----  ----  ----  X---  ----  -X--  -X--  ----  ---X
 19  ----  ----  ----  ----  X---  ----  ----  -X--  -X--  -X-X
 24  ----  ----  ----  ----  ----  ----  ----  ----  ----  ----
 25  ----  -X--  ----  ----  ----  ----  -X--  ----  ----  ----
 40  ----  ----  ----  ----  ----  ----  ----  ----  ----  ----
 41  X-X-  ----  X---  ----  ----  -X--  X---  ----  ----  ----
 48  ----  ----  ----  ----  ----  ----  ----  ----  ----  ----
 49  X-X-  ----  -X--  ----  ----  -X--  X---  ----  ----  ----
 56  ----  ----  ----  ----  ----  ----  ----  ----  ----  ----
 57  ----  ----  ----  X---  ----  ----  -X--  ----  ----  ----
 64  ----  ----  ----  ----  ----  ----  ----  ----  ----  ----
 65  ----  ----  ----  -X--  ----  ----  -X--  ----  ----  ----
```

B-10

Part No:      U66*(PAL20X4)
Part Type:    PAL
Function:     I/O Command/Status
Program:

```
+XPLOT
#P
  00  ---- ---- ---- ---- ---- ---- ---- ---- ---- ----
  01  ---- ---- ---- -X-- ---- ---- ---- ---X -X-X ----
  08  ---- ---- ---- ---- ---- ---- ---- ---- ---- ----
  09  ---- ---- ---- X--- ---- ---- ---- ---- -XX- ---X
  16  ---- ---- ---- ---- ---- ---- ---- ---- ---- ----
  17  ---- ---- ---- X--- ---- ---- ---- ---- -X-X ----
  24  X--- ---- X--- -X-- ---- ---- ---- ---- -XX- X--X
  25  ---- ---- X--- ---X ---- ---- ---- ---- ---- ----
  26  -X-- ---- X--- ---X ---- ---- ---- ---- ---- ----
  32  ---X X--- X--- ---- ---- ---- ---- ---- ---- X-X-
  33  ---- ---- X--- ---- ---X ---- ---- ---- ---- ----
  34  ---- -X-- X--- ---- ---X ---- ---- ---- ---- ----
  40  ---- ---- X--- ---- ---- -X-- X--- X--- ---- ----
  41  ---- ---- X--- ---- ---- ---X ---- ---- ---- ----
  42  ---- ---- X--- X--- ---- ---X ---- ---- -X-X X-X-
  48  ---- ---- X--- -X-- ---- ---- ---- ---- -X-X X-X-
  49  ---- ---- X--- ---- ---- ---X ---- ---- ---- ----
  50  ---- ---- X--- ---- -X-- ---- X--X X--- ---- ----
  56  ---- ---- ---- ---- ---- ---- ---- ---- ---- ----
  57  ---- ---- ---- -X-- ---- ---- ---- ---- -X-X ----
```

B-11

Part No:      U7P*(PAL16L8A)
Part Type:    PAL
Function:     MMU MUX
Program:

```
+XPLOT
#P
  00  ---- ---- ---- ---- ---- ---- ---- ----
  01  --X- ---- ---- ---- ---- ---- ---- -XX-
  02  --X- ---- ---- ---- ---- X--- ---- X-X-
  03  ---- ---- ---- ---- ---- X--- ---- ---X
  08  ---- ---- ---- ---- ---- ---- ---- ----
  09  X--- ---- ---- ---- ---- ---- ---- -XX-
  10  X--- ---- ---- ---- ---- X--- ---- X-X-
  11  ---- ---- ---- ---- ---- X--- ---- ---X
  16  ---- ---- ---- ---- ---- ---- ---- ----
  17  ---- X--- ---- ---- ---- ---X ---- -XX-
  18  ---- ---- ---- X--- ---- --X- ---- -XX-
  19  ---- X--- ---- ---- ---- X--X ---- X-X-
  20  ---- ---- ---- X--- ---- X-X- ---- X-X-
  21  ---- ---- ---- X--- ---- -X-- ---- X-X-
  22  ---- ---- ---- X--- ---- ---- ---- ---X
  24  ---- ---- ---- ---- ---- ---- ---- ----
  25  ---- ---- ---- ---- X--- ---- ---X -X--
  26  ---- ---- ---- X--- ---- ---X ---- -X--
```

```
27 ---- ---- ---- ---- X--- ---- -X--
56 ---- ---- ---- ---- ---- ---- ----
57 ---- ---- X--- ---- ---- ---X -XX-
58 ---- ---- ---- X--- ---- --X- -XX-
59 ---- ---- X--- ---- X--- ---X X-X-
60 ---- ---- ---- X--- X--- --X- X-X-
61 ---- ---- ---- X--- -X-- ---- X-X-
62 ---- ---- ---- X--- ---- ---- ---X
```

B-12

Part No: U72 (PAL16L8A)
Part Type: PAL
Function: MMU MUX
Program:

```
+XPLOT
#P
00 ---- ---- ---- ---- ---- ---- ---- ----
01 ---- ---X ---- ---- ---- X--- ---- ---X
02 ---- ---- --X- ---- X--- ---- ---- ---X
03 ---- ---- ---- X--X ---- ---- ---- ---X
40 ---- ---- ---- ---- ---- ---- ---- ----
41 --X- ---X X--- ---- ---- ---- ---- ---X
42 --X- --X- ---- ---- ---- X--- ---- ---X
43 --X- ---X X--- ---- ---- X--- ---- -X--
44 --X- --X- ---- ---- ---- X--- X--- -X--
45 --X- ---- ---- ---- ---- X--- -X-- --X-
46 ---X ---- ---- ---- ---- X--- ---- ----
48 ---- ---- ---- ---- ---- ---- ---- ----
49 --X- X--- --X- ---- ---- ---- ---- ---X
50 --X- ---- --X- ---- X--- ---- ---- ---X
51 --X- X--- --X- ---- ---- ---- X--- --X-
52 --X- ---- --X- ---- X--- ---- X--- --X-
53 --X- ---- ---- ---- X--- ---- -X-- --X-
54 ---X ---- ---- ---- X--- ---- ---- ----
56 ---- ---- ---- ---- ---- ---- ---- ----
57 X-X- ---- ---- ---X ---- ---- ---- ---X
58 --X- ---- ---- X-X- ---- ---- ---- ---X
59 X-X- ---- ---- ---X ---- ---- X--- --X-
60 --X- ---- ---- X-X- ---- ---- X--- --X-
61 --X- ---- ---- X--- ---- ---- -X-- --X-
62 ---X ---- ---- X--- ---- ---- ---- ----
```

B-13

Part No: U81 (PAL16R4A)
Part Type: PAL
Function: Interrupt Handler
Program:

```
+XPLOT
#P
08 ---- ---- ---- ---- ---- ---- ---- ----
09 -X-X -X-- X--- -X-- ---- ---- ---- ----
10 X--X -X-- X--- ---- -X-- ---- ---- ----
11 -X-X X--- -X-- ---- ---- -X-- ---- ----
```

```
12 -X-X X--- X--- ---- ---- ---- -X-- ----
13 X--X -X-- -X-- ---- ---- ---- ---- -X--
24 ---- ---X ---- ---- ---- ---- ---- ---X
32 ---- ---- ---- ---X ---- ---- ---- ----
48 ---- ---- ---- ---- ---- ---- ---- ----
49 -X-X -X-- X--- X--- --X- ---- ---- ---X
50 X--X -X-- X--- ---- X-X- ---- ---- ---X
51 -X-X X--- -X-- ---- --X- X--- ---- ---X
52 -X-X X--- X--- ---- --X- ---- X--- ---X
53 X--X -X-- -X-- ---- --X- ---- ---- X--X
```

B-14

Part No:     U83*(PAL16R6)
Part Type:   PAL
Function:    DTB/Arbiter, Level 1
Program:

```
+XPLOT
#P
  00 ---- ---- ---- ---- ---- ---- ---- ----
  01 ---- ---- ---- ---- ---- -X-- ---X ----
  02 ---- ---- ---- ---- ---- -X-X ---- ----
  03 ---- ---- ---- ---- ---X -X-- ---- ----
  04 ---- ---- ---- ---X ---- -X-- ---- ----
  08 ---- ---- ---- ---- ---- -X-- ---- ----
  16 X--- X--- X--- X--- -X-- X--- ---- ----
  24 ---- ---- ---- -X-- ---- X--- ---- ----
  32 ---- ---- -X-- X--- ---- X--- ---- ----
  40 ---- -X-- X--- X--- ---- X--- ---- ----
  48 -X-- X--- X--- X--- ---- X--- ---- ----
  56 ---- ---- ---- ---- ---- ---- ---- ----
  57 -X-- ---- ---- ---- ---- ---- ---- ----
  58 ---- -X-- ---- ---- ---- ---- ---- ----
  59 ---- ---- -X-- ---- ---- ---- ---- ----
  60 ---- ---- ---- -X-- ---- ---- ---- ----
  61 ---- ---- ---- ---- ---- -X-- ---- ----
```

B-15

Part No:     U100 (PAL16R4)
Part Type:   PAL
Function:    Interrupt Handler
Program:

```
+XPLOT
#P
  00 ---- ---- ---- ---- ---- ---- ---- ----
  01 ---- --X- ---- ---- ---- ---- --X- X-X-
  24 ---- X--- ---- X--- ---- X--- -X-- ----
  25 ---- X--- ---- X--- -X-- ---- ---- ----
  26 ---- X--- -X-- ---- ---- ---- ---- ----
  27 -X-- ---- ---- ---- ---- ---- ---- ----
  32 ---- ---- X--- X--- ---- -X-- ---- ----
  33 ---- ---- X--- X--- -X-- ---- ---- ----
  34 ---- -X-- ---- ---- ---- ---- ---- ----
  35 -X-- ---- ---- ---- ---- ---- ---- ----
  40 ---- ---- ---- -X-- ---- ---- ---- ----
  41 ---- ---- -X-- ---- ---- ---- ---- ----
  42 ---- -X-- ---- ---- ---- ---- ---- ----
  43 -X-- ---- ---- ---- ---- ---- ---- ----
```

B-16

```
Part No:     U101 (PAL14L8)
Part Type:   PAL
Function:    DTB Requester
Program:

+XPLOT
#P
   08  ----  ----X  --  --  --  --  --  --  ----  ----
   09  ----  ----   --  --  --  --  --  --  ----  X--X
   16  ----  ----   --  --  X-  --  --  --  ----  -X--
   24  ----  ----   --  -X  --  --  --  --  --X-  ----
   32  X-X-  X---   X-  X-  --  --  --  --  --X-  ----
   40  ----  ----   --  --  --  --  --  --  -X--  ----
   41  ----  ----   --  --  --  --  --  --  ----  -X--
   48  ----  ----   --  --  --  --  --  -X  ----  ----
   49  ----  ----   --  --  --  --  --  --  ----  -X--
   56  ----  ----   --  --  --  --  -X  --  ----  ----
   57  ----  ----   --  --  --  --  --  --  ----  -X--
   64  ----  ----   --  --  --  -X  --  --  ----  ----
   65  ----  ----   --  --  --  --  --  --  ----  -X--
```

B-17

```
Part No:     U102 (PAL20X4)
Part Type:   PAL
Function:    DTB Arbiter
Program:

+XPLOT
#P
   00  ----  ----  ----  ----  ----  ----  ----  ----  ----  ----
   01  ----  -X--  ----  ----  ----  ----  ----  ----  ----  X---
   02  ----  ----  ----  ----  ----  ----  ----  ----  ----  ---X
   03  ----  ----  ----  ----  ----  ----  ----  ----  --X-  ----
   08  ----  ----  ----  ----  ----  ----  ----  ----  ----  ----
   09  ----  X---  ----  ----  ----  ----  -X--  ----  ----  ----
   10  ----  ----  ----  ----  ----  ----  ----  ----  --X-  ----
   16  ----  ----  ----  ----  ----  ----  ----  ----  ----  ----
   17  ----  -X--  ----  ----  ----  ----  ----  ----  ----  X---
   18  ----  ----  ----  ----  ----  ----  ----  ----  ----  ---X
   19  ----  ----  ----  ----  ----  ----  ----  ----  --X-  ----
   24  ----  ----  ----  --X-  ----  -X--  X---  ----  ----  -X--
   25  ----  ----  ----  --X-  ----  ----  ----  ----  ----  ----
   26  ----  ----  ----  --X-  ----  ----  -X--  ----  ----  ----
   32  ----  ----  ----  ----  -XX-  ----  X---  ----  ----  -X--
   33  ----  ----  ----  ----  ---X  ----  ----  ----  ----  ----
   34  ----  ----  ----  ----  ---X  ----  -X--  ----  ----  ----
   40  ----  ----  ----  -X--  ----  --X-  X---  ----  ----  -X--
   41  ----  ----  ----  ----  ----  ---X  ----  ----  ----  ----
   42  ----  ----  ----  ----  ----  ---X  -X--  ----  ----  ----
   48  ----  ----  -X--  ----  ----  ----  X-X-  ----  ----  -X--
   49  ----  ----  ----  ----  ----  ----  ---X  ----  ----  ----
   50  ----  ----  ----  ----  ----  ----  -X-X  ----  ----  ----
   56  ----  ----  ----  ----  ----  ----  ----  ----  ----  ----
   57  -X--  ----  ----  ----  ----  ----  ----  ----  -X--  ----
   64  ----  ----  ----  ----  ----  ----  ----  ----  ----  ----
   65  ----  ----  ----  ----  ----  ----  ----  ---X  ----  ----
```

B-18

Part No:    U118 (PAL20L10)
Part Type:  PAL
Function:   Interrupt Handler
Program:

```
+XPLOT
#P
  16 ---- ---- ---- ---- ---- ---- ---- ---- ---- ----
  17 ---- ---- ---- ---- -X-- -X-- ---- ---- ---- ----
  18 ---- ---- ---- -X-- ---- ---- ---- ---- ---- ----
  24 ---- ---- ---- ---- ---- ---- ---- ---- ---- ----
  25 ---- ---- ---- ---- -X-- ---- -X-- ---- ---- ----
  26 ---- -X-- ---- ---- ---- ---- ---- ---- ---- ----
  32 ---- ---- ---- ---- ---- ---- ---- ---- ---- ----
  33 ---- ---- ---- ---- -X-- ---- ---- -X-- ---- ----
  40 ---- ---- ---- ---- ---- ---- ---- ---- ---- ----
  41 ---- ---- ---- ---- -X-- ---- ---- ---- ---- ----
  42 ---X ---- ---- ---- ---- ---- ---- -X-- ---- ----
  48 ---- ---- ---- ---- ---- ---- ---- ---- ---- ----
  49 ---- ---- ---- ---- -X-- ---- ---- ---- ---- -X--
  50 -X-- ---- ---- ---- ---- ---- ---- ---- ---- ----
  56 ---- ---- ---- ---- ---- ---- ---- ---- ---- ----
  57 ---- ---- ---- ---- -X-- ---- ---- ---- ---- ---X
  58 ---- ---- -X-- ---- ---- ---- ---- ---- ---- ----
  59 ---- ---X ---- ---- ---- ---- ---- ---- ---- ----
  72 ---- ---- ---- ---- ---- ---- ---- ---- ---- ----
  73 ---- ---- ---- ---- -X-- ---- ---- ---- ---X ----
```

B-19

Part No:    U120 (PAL16L8)
Part Type:  PAL
Function:   Interrupt Handler
Program:

```
+XPLOT
#P
  00 ---- ---- ---- ---- ---- ---- ---- ----
  01 -X-- ---- ---- ---- ---- -X-- ---- ----
  08 ---- ---- ---- ---- ---- ---- ---- ----
  09 ---- -X-- ---- ---- ---- ---- -X-- ----
  16 ---- ---- ---- ---- ---- ---- ---- ----
  17 ---- ---- -X-- ---- ---- ---- ---- -X--
  24 ---- ---- ---- ---- ---- ---- ---- ----
  25 ---- ---- ---- -X-- ---- ---- ---- ---X
  32 ---- ---- ---- ---- ---- ---- ---- ----
  33 ---- ---- ---- ---- ---- ---X ---- -X--
  56 ---- ---- ---- ---- ---- ---- ---- ----
  57 ---X ---- ---- ---- -X-- ---- ---- ----
```

What is claimed is:

1. In a data processing system comprising a memory unit storing instructions and data, a central processing unit coupled to said memory unit and processing successively in time a plurality of tasks using said instructions and data, each task being uniquely identified by a task identity number, and a memory management unit coupled to said memory unit and to said processing unit for translating logical addresses generated by said processing unit relating to said tasks into physical addresses in said memory unit, said memory unit comprising an addressable memory space which is divided into a plurality of pages, the improvement wherein said memory management unit comprises:

task register means for storing the task identity number of the task currently being processed by said processing unit, said task identity number being loaded into said task register means by said processing unit, prior to processing said task, in response to said processing unit executing one of said instructions, page table means comprising a plurality of entries each storing one of said physical addresses corresponding to at least one logical address generated by said processing unit for each task, said page table means being responsive to said task identity number stored in said task register means and to one of said logical addresses generated by said processing unit for generating the physical address corresponding to said at least one logical address of said task currently being processed by said processing unit, page register means for storing an indication of the number of said plurality of tasks, said indications of said page register means also identifying the number of pages in said memory unit which are allocated to each task, said allocated number of pages per task being equal to said plurality of pages divided by said plurality of tasks, said page register means being loaded, prior to said processing unit processing the current task, by said processing unit in response to said processing unit executing a second one of said instructions, and wherein said page table means is also responsive to said indication of said page register means for generating said physical address, and wherein said plurality of entries of said page table means comprises a plurality of groups of entries, one group of entries corresponding to each task, wherein each entry of said page table means further comprises a last page indication portion, wherein the last page indication portion of the last entry of the group of entries corresponding to the task currently being processed by said processing unit is set to a predetermined state in response to said processing unit executing a third one of said instructions prior to processing said task, and wherein said memory management unit comprises means connected to the page table means responsive to said predetermined state of said last page indication portion for generating an interrupt to said processing unit when said task currently being processed by said processing unit is utilizing the last page allocated to it.

* * * * *